United States Patent

Kuwabara et al.

[11] Patent Number: 5,909,439
[45] Date of Patent: Jun. 1, 1999

[54] SATELLITE COMMUNICATIONS SYSTEM

[75] Inventors: Toru Kuwabara; Takao Udaka; Norihiko Nakazawa, all of Tokyo; Kazuyoshi Miyoshi, Hiroshima, all of Japan

[73] Assignee: Mitsubishi Denki Kabushiki Kaisha, Tokyo, Japan

[21] Appl. No.: 08/657,468

[22] Filed: May 29, 1996

[30] Foreign Application Priority Data

May 30, 1995 [JP] Japan ..................................... 7-131738
May 22, 1996 [JP] Japan ..................................... 8-127356

[51] Int. Cl.⁶ ..................................................... H04J 3/16
[52] U.S. Cl. ........................................... 370/389; 370/465
[58] Field of Search ..................................... 370/389, 395,
370/310, 312, 313, 314, 316, 321, 324,
325, 326, 327, 329, 336, 341, 337, 347,
345, 346, 349, 376, 375, 392, 442, 443,
449, 458, 462, 465, 466, 467, 470, 471,
472, 475, 486, 485, 493, 498; 455/12.1,
13.2, 13.3, 15; 379/92.01; 340/825.08;
348/7, 10, 12, 6

[56] References Cited

U.S. PATENT DOCUMENTS

| | | | |
|---|---|---|---|
| 4,942,602 | 7/1990 | Baker | 370/270 |
| 5,029,164 | 7/1991 | Goldstein | 370/396 |
| 5,191,410 | 3/1993 | McCalley et al. | 379/105 |
| 5,481,542 | 1/1996 | Logston et al. | 370/442 |

*Primary Examiner*—Dang Ton
*Attorney, Agent, or Firm*—Rothwell, Figg, Ernst & Kurz

[57] ABSTRACT

To realize a system which can efficiently use a satellite communications or broadcasting channel and simply realize modes suitable for applications such as shopping, wherein the system also has a large-scale subscription. A system was configured wherein for information sent from a satellite the header of a packet is deemed as an information identifier based on the content of the information, or alternatively information having a receiving terminal identifier provided beforehand to the receiving terminal is combined with information having an information identifier based on the content of the information.

10 Claims, 20 Drawing Sheets

NO. OF REQUESTSLOWER DATA DEPTH

SATELLITE COMMUNICATIONS SYSTEM

BACKGROUND OF THE INVENTION

1. Field of the Invention

The present invention relates generally to a satellite communications or broadcasting system and a satellite signal receiving terminal for supplying a variety of lifestyle information by means of a satellite communications or broadcasting channel.

2. Description of the Prior Art

The following description takes as its example a bi-directional shopping system using a CATV cable channel and a telephone channel.

FIG. 36 is a block diagram of an example of an Interactive Multimedia Presentation and Communications System disclosed in U.S. Pat. No. 5,191,410. 60 is a home, 61 is a television which receives and displays an analog television signal, 62 is a control pad of a touch-tone telephone, and the user connects to a local operating center (hereinafter abbreviated to LOC) by dialling an LOC telephone number displayed on the television screen. The user then transmits a number corresponding to the desired shopping information or comments relating to that information displayed on the television screen via a telephone line 66 to LOC 63. LOC 63 allocates an identifier which identifies the user (the user's receiving terminal) corresponding to that telephone number and together with the shopping information which has been requested sends information to the head end of the CATV to which the user is subscribing.

FIG. 37 shows an example of a frame configuration of the multi-layered shopping information when this address has been allocated. S is a frame synchronizing signal; Da, Db, Dc are data of the shopping information (hereinafter referred to as "data"); Pa, Pb, Pc are identifiers of user receiving terminals 60A, 60B, 60C; 5 is a header to which a receiving terminal identifier is inserted; a packet is comprised of a header 5 and data, and one frame is comprised of a frame synchronizing signal and a multi-layered plurality of packets. A head end 64 of the CATV carries out digital modulation of this frame with a frequency band determined beforehand and transmits it on a CATV cable 67. A presentation player 65 contains a plurality of players synchronized with a plurality of receiving terminals in order to carry out this data service, and a number of receiving terminals greater than this simultaneous processing ability is apportioned to one presentation player. From these, the presentation player picks out only the data which have a receiving terminal identifier for which the presentation player itself is responsible, converts these data to an analog television signal, and transmits the television signal of the requested shopping information on a special-purpose channel apportioned beforehand into receiving terminals 60A, 60B, and 60C. The analog television programs now flowing from the CATV head end are now transmitted unchanged on other channels to each of the receiving terminals.

In general, shopping information is concentrated on a single piece of information, and in a case in which the receiving terminals 60A, 60B, and 60C have simultaneously or almost simultaneously requested identical data, for instance Da, the frame configuration becomes that shown in FIG. 38 and the same Da data are multiply transmitted to each of the packets. In such a case, the receiving terminal identifiers of each of the receiving terminals 60A, 60B, and 60C are distributed in advance by some means.

Since previous shopping systems using a CATV cable channel have been configured as described above, a multitude of identical data having different destinations have existed within the same frame with the resulting problems that the channels become occupied and the transmission efficiency of the shopping data decreases.

Furthermore, in the case of advertisements, commercials, and shopping malls and the like capable of virtual shopping, although common information is available to the user, since each of the receiving terminals make requests to the information center separately this leads to the problems that processing of the local operation center becomes extremely complex, accessing takes a long time, and the transmission efficiency of the shopping data decreases.

Moreover, even in a case in which shopping information is displayed as a stationary image, since this is converted to an analog signal at the presentation player and transmitted to each of the receiving terminals, the preparation of special channels capable of simultaneously accessing this shopping data service requires a considerable number of MHz, for instance the preparation of 8 channels (i.e. 8 receiving terminals) for one presentation player uses 48 MHz, thus this band cannot be used so as to reach a user belonging to this presentation player not using the service, causing great problems for the service.

SUMMARY OF THE INVENTION

It is therefore the object of the present invention to solve problems of the type described above, and together with improving transmission efficiency to increase greatly the number of receiving terminals which can be used simultaneously, to shorten accessing time to the information, and to provide a satellite communications or broadcasting system which can be easily used in real time with shopping applications and the like.

In order to solve the above-mentioned problems, a first aspect of the invention is a satellite communications or broadcasting system for transmitting information sent from an information center to a satellite signal receiving terminal via a satellite communications or broadcasting channel, wherein the information center includes an identifier allocating means for allocating an identifier to information requested from the information center by the satellite signal receiving terminal based on the contents of that information, and a transmitting means for transmitting the information to which the identifier has been allocated via a satellite communications or broadcasting channel; and wherein the satellite signal receiving terminal includes a selecting means for selecting the information which has been requested by the terminal itself from the transmitted information based on the identifier.

According to the first aspect of the present invention, an information center organizes separately the contents of the information requested by the satellite signal receiving terminal, allocates identifiers showing the respective contents and transmits the information via a satellite communications or broadcasting channel; a satellite signal receiving terminal selects and receives the requested information from the information received based on the above-mentioned layer identifier.

Any identifier showing the content of the information may be used, but an identifier showing layer structure is preferable. A layer identifier is preferable for use in each of the aspects of the present invention described below.

In order to solve the above-mentioned problems, a second aspect of the present invention is a satellite communications or broadcasting system of the first aspect of the present invention wherein the satellite signal receiving terminal includes a request sending means for sending the request via a ground circuit.

According to the second aspect of the present invention, one or a plurality of satellite signal receiving terminals executes a request to the information center via a ground communications circuit, the information center organizes separately the contents of the information requested by the satellite signal receiving terminal, allocates identifiers showing the respective contents and transmits the information via a satellite communications or broadcasting channel; and a satellite signal receiving terminal which has received this transmitted information selects and receives its desired information based on an identifier showing the content of that information.

In order to solve the above-mentioned problems, a second aspect of the present invention is a satellite communications or broadcasting system of the first aspect of the present invention wherein the information center includes a request counting means for counting the number of requests for a designated piece of information, a transmission repetition number determining means for determining the number of transmission repetitions of a designated piece of information based on the number of requests counted by the request counting means, and a transmitting means for transmitting the designated information only the number of transmission repetitions determined by the transmission repetition number determining means.

According to the third aspect of the present invention, an information center organizes separately the contents of information for which a request has been executed to the information center by one or a plurality of satellite signal receiving terminals via a ground communications circuit, allocates identifiers showing the respective contents, allocates a number of repetition transmissions determined in accordance with the number of requests for this information or a number of remaining transmissions and executes transmission via a satellite communications or broadcasting channel; and a satellite signal receiving terminal which has received this transmitted information examines the above-mentioned number of transmissions or the number of remaining transmissions and acknowledges the presence of re-transmission.

In order to solve the above-mentioned problems, a fourth aspect of the present invention is a satellite communications or broadcasting system of the second aspect of the present invention, wherein the information center includes an allocating means for allocating to the information to be transmitted when the designated information is transmitted only at the number of transmission repetitions determined by the transmission repetition number determining means either the remaining number of times which information having content identical to that of the designated information is to be transmitted, or alternatively, the number of repetitions of that information to be transmitted; and the satellite signal receiving terminal includes a re-transmission judging means for referring to the remaining number of transmissions allocated to the transmitted information, or alternatively, to the number of repetitions to be transmitted, and for judging whether or not the designated information is to be re-transmitted.

As in the third aspect of the present invention described above, according to the fourth aspect of the present invention an information center organizes separately the contents of information for which a request has been executed to the information center by one or a plurality of satellite signal receiving terminals via a ground communications circuit, allocates identifiers showing the respective contents, allocates a number of repetition transmissions determined in accordance with the number of requests for this information or a number of remaining transmissions and executes transmission via a satellite communications or broadcasting channel; and a satellite signal receiving terminal which has received this transmitted information examines the above-mentioned number of transmissions or the number of remaining transmissions and acknowledges the presence of re-transmission.

In order to solve the above-mentioned problems, a fifth aspect of the present invention is a satellite signal receiving terminal for receiving via a satellite communications or broadcasting channel information sent from an information center, wherein the satellite signal receiving terminal includes a re-transmission judging means for referring to the remaining number of transmissions allocated to the transmitted information, or alternatively, to the number of repetitions to be transmitted, and for judging whether or not the designated information is to be re-transmitted.

According to the fifth aspect of the present invention, an information center organizes separately the contents of information which has been requested, allocates identifiers showing the respective contents, allocates a number of repetition transmissions determined in accordance with the number of requests for this information or a number of remaining transmissions, executes transmission via a satellite communications or broadcasting channel, and examines the above-mentioned number of transmissions or the number of remaining transmissions and acknowledges the presence of re-transmission.

In order to solve the above-mentioned problems, a sixth aspect of the present invention is a satellite signal receiving terminal of the first aspect of the present invention for receiving via a satellite communications or broadcasting channel information sent from an information center, wherein the information center includes a dividing means for dividing into packet data the information to which an identifier has been allocated by the identifier allocating means, a transmission number allocating means for allocating to the packet data the identifier and the number of transmission repetitions fixed in response to the number of requests for this information or the remaining number of transmissions, and for supplying this packet data after allocating to the transmitting means; and wherein the satellite signal receiving terminal includes a reconstituting means for integrating the transmitted information divided into packet data and reconstituting original information, and a re-transmitting judging means for judging the existence of re-transmission of the information based on the number of transmissions allocated to reconstituted data or the remaining number of transmissions.

According to the sixth aspect of the present invention, an information center organizes separately the contents of information for which a request has been executed to the information center by one or a plurality of satellite signal receiving terminals via a ground communications circuit, allocates identifiers showing the respective contents, allocates a number of repetition transmissions determined in accordance with the number of requests for this information or a number of remaining transmissions and executes transmission via a satellite communications or broadcasting channel; and a satellite signal receiving terminal which has received this transmitted information examines the above-mentioned number of transmissions or the number of remaining transmissions and acknowledges the presence of re-transmission.

In order to solve the above-mentioned problems, a seventh aspect of the present invention is a satellite signal receiving terminal of the fifth aspect of the present invention, which includes a reconstituting means for integrating the transmitted information divided into packet data, reconstituting original information, and supplying reconstituted information to the re-transmission judging means.

According to the seventh aspect of the present invention, an information center organizes separately the contents of information which has been requested, allocates identifiers showing the respective contents, then divides the information into packet data, allocates a number of repetition transmissions determined in accordance with the number of requests for this information or a number of remaining transmissions, executes transmission via a satellite communications or broadcasting channel, and examines the above-mentioned number of transmissions or the number of remaining transmissions and acknowledges the presence of re-transmission.

In order to solve the above-mentioned problems, an eighth aspect of the present invention is a satellite communications or broadcasting system of the first aspect of the present invention, wherein the information center includes a dividing means for dividing the information to which an identifier has been allocated by the identifier allocating means into packet data, a transmission number allocating means for allocating to one portion only within a plurality of packet data following dividing the identifier and the number of transmission repetitions fixed in response to the number of requests for this information or the remaining number of transmissions, and for supplying this packet data after allocating to the transmitting means; and the satellite signal receiving terminal includes a reconstituting means for integrating the transmitted information divided into packet data, and reconstituting original information, and a re-transmitting judging means for judging the existence of re-transmission of the information based on the number of transmissions allocated to one portion of the plurality of packets which were storing the reconstituted information or the remaining number of transmissions.

According to the eighth aspect of the present invention, the information center organizes separately the contents of information which has been requested, allocates identifiers showing the respective contents, then divides the information into packets, allocates to one portion of the above-mentioned packets an identifier and a number of repetition transmissions determined in accordance with the number of requests for this information or a number of remaining transmissions, and executes transmission via a satellite communications or broadcasting channel; and the satellite signal receiving terminal which has received this transmitted information examines the above-mentioned number of transmissions or the number of remaining transmissions and acknowledges the presence of re-transmission.

In order to solve the above-mentioned problems, a ninth aspect of the present invention is a satellite signal receiving terminal of the fifth aspect of the present invention, which includes a reconstituting means for integrating the transmitted information divided into packet data and reconstituting original information, and a re-transmitting judging means for judging the existence of re-transmission of the information based on the number of transmissions allocated to one portion of the plurality of packets which were storing the reconstituted information or the remaining number of transmissions.

According to the ninth aspect of the present invention, an information center divides the information into a plurality of frames, allocates a number showing an identifier and the sequence of the divided information, repeatedly transmits the information a multiple number of times to a satellite communications or broadcasting channel, arranges the received information into its correct sequence based on the above-mentioned number showing the information sequence and chooses the desired information based on the above-mentioned identifier.

In order to solve the above-mentioned problems, a tenth aspect of the present invention is a satellite communications or broadcasting system for transmitting to a satellite signal receiving terminal via a satellite communications or broadcasting channel information sent from an information center, wherein the information center includes a dividing means for dividing information to be transmitted into a plurality of frames, a sequence number allocating means for allocating a sequence number showing the sequence of each division of the information, and an identifier based on the content of each division of the information, to each of the frames, a repetition transmitting means for repeatedly transmitting each frame to which a sequence number has been allocated to a satellite communications or broadcasting channel; and wherein the satellite signal receiving terminal includes a reconstituting means for reconstituting original information by arranging divided information included in each frame based on the sequence number allocated to each repeatedly transmitted frame.

According to the tenth aspect of the present invention, an information center divides information having differing contents into respective frames, allocates a number showing the sequence of the divided frames and a layer identifier to each layered information, repeatedly transmits the information a multiple number of times via a satellite communications or broadcasting channel; and a satellite signal receiving terminal arranges the received information into its correct sequence based on the above-mentioned number showing the frame sequence and chooses the desired information based on the above-mentioned identifier.

In order to solve the above-mentioned problems, an eleventh aspect of the present invention is a satellite communications or broadcasting system for transmitting to a satellite signal receiving terminal via a satellite communications or broadcasting channel information sent from an information center, wherein the information center includes a dividing means for dividing information to be transmitted into a plurality of packets, a sequence number allocating means for allocating a sequence number showing the sequence of each division of the information to each of the packets, a repetition transmitting means for repeatedly transmitting each packet to which a sequence number has been allocated to a satellite communications or broadcasting channel; and the satellite signal receiving terminal includes a reconstituting means for reconstituting original information by arranging divided information included in each packet based on the sequence number allocated to each repeatedly transmitted packet, and a selecting means for selecting a designated piece of information based on the identifier from among reconstituted information.

As in the tenth aspect of the present invention, according to the eleventh aspect of the present invention, an information center divides information having differing contents into respective frames, allocates a number showing the sequence of the divided frames and a layer identifier to each layered information, repeatedly transmits the information a multiple number of times via a satellite communications or broadcasting channel; and a satellite signal receiving terminal arranges the received information into its correct sequence based on the above-mentioned number showing the frame sequence and chooses the desired information based on the above-mentioned identifier.

In order to solve the above-mentioned problems, a twelfth aspect of the present invention is a satellite communications receiving terminal for receiving via a satellite communications or broadcasting channel information divided into a plurality of frames, to each frame of which an identifier and a sequence number showing the sequence of each frame have been allocated, transmitted by an information center, wherein the satellite communications receiving terminal includes a reconstituting means for reconstituting original information by arranging divided information included in each frame based on the sequence number allocated to each repeatedly transmitted frame, and a selecting means for selecting a designated piece of information based on the identifier from among reconstituted information.

A layer identifier showing the information layer within the layer structure is appropriate as an identifier here. In order to solve the above-mentioned problems, a thirteenth aspect of the present invention is a satellite communications receiving terminal for receiving via a satellite communications or broadcasting channel information divided into a plurality of packets, to each packet of which an identifier and a sequence number showing the sequence of each packet have been allocated, transmitted by an information center, wherein the satellite communications receiving terminal includes a reconstituting means for reconstituting original information by arranging divided information included in each packet based on the sequence number allocated to each repeatedly transmitted packet, and a selecting means for selecting the desired information based on the identifier from among reconstituted information.

According to the thirteenth aspect of the present invention, since an information center has divided information which has been requested by a satellite signal receiving terminal into a plurality of packets and allocated a correct information sequence to each packet, the original information can easily be arranged in its correct sequence.

In order to solve the above-mentioned problems, a fourteenth aspect of the present invention is a satellite communications or broadcasting system for transmitting information sent from an information center to a satellite signal receiving terminal via a satellite communications or broadcasting channel, wherein the information center includes a managing means for managing information to be transmitted with a layered hierarchy, a No. 1 layer identifier allocating means for allocating a layer identifier to a piece of information requested from the information center by the satellite signal receiving terminal based on the layer of that information, a No. 2 layer identifier allocating means for allocating a layer identifier to a piece of information at an even lower layer than a piece of information requested from the information center by the satellite signal receiving terminal based on that lower layer, a transmitting means for transmitting via a satellite communications or broadcasting channel the information to which a layer identifier has been allocated by the No. 1 layer identifier allocating means and the lower information to which a lower layer identifier has been allocated by the No. 2 layer identifier allocating means; and wherein the satellite signal receiving terminal includes a selecting means for selecting the information which has been requested by the terminal itself from the transmitted information based on the layer identifier, and a storing means for storing the lower information transmitted by the information center in preparation for future requests.

According to the fourteenth aspect of the present invention, an information center allocates a layer identifier to information at an even lower layer than information that has been requested and transmits it via a satellite communications or broadcasting channel; and a satellite signal receiving terminal searches within its own collecting apparatus prior to making a request to the above-mentioned information center.

In order to solve the above-mentioned problems, a fifteenth aspect of the present invention is a satellite signal receiving terminal for receiving via a satellite communications or broadcasting channel information to which a layer identifier has been allocated, and transmitted information at a lower layer to which a layer identifier showing the lower layer has been allocated, the information being transmitted by an information center, wherein the satellite signal receiving terminal includes a selecting means for selecting the information which has been requested by the terminal itself from the transmitted information based on the layer identifier, a storing means for storing the lower information transmitted by the information center in preparation for future requests, and an information requesting means for requesting information from the information center; and wherein the information requesting means includes a detecting means for detecting whether or not a desired piece of information is contained in the storing means, and a requesting means for outputting a request to the information center only when the detecting means has been unable to locate a desired piece of information in the storing means.

According to the fifteenth aspect of the present invention, an information center allocates a layer identifier to information at an even lower layer than information that has been requested and transmits it via a satellite communications or broadcasting channel; and a satellite signal receiving terminal searches within its own collecting apparatus prior to making a request to the above-mentioned information center.

In order to solve the above-mentioned problems, a sixteenth aspect of the present invention is a satellite communications or broadcasting system of the fourteenth aspect of the present invention, wherein the No. 2 layer identifier allocating means includes a counting means for counting the number of requests for information, a multi-layer identifier allocating means, which is a means of allocating a layer identifier to information at a lower layer than the information which has been requested, for allocating a layer identifier to information at all layers lower than a depth based on the number counted by the counting means; and wherein the transmitting means transmits via a satellite communications or broadcasting channel the information to which a layer identifier has been allocated by the No. 1 layer identifier allocating means and information at a plurality of lower layers to which a lower layer identifier has been allocated by the No. 2 layer identifier allocating means.

According to the sixteenth aspect of the present invention, an information center transmits via a satellite communications or broadcasting channel information as far as information at a layer of a depth in response to the number of requests for the information.

In order to solve the above-mentioned problems, a seventeenth aspect of the present invention is a satellite signal receiving terminal for receiving via a satellite communications or broadcasting channel transmitted information to which a layer identifier has been allocated, and transmitted information at a plurality of lower layers to which a layer identifier showing the lower layers has been allocated, the information being transmitted by an information center, wherein the satellite signal receiving terminal includes a selecting means for selecting the information which has been requested by the terminal itself from the transmitted information based on the layer identifier, a storing means for storing the lower information transmitted by the information center in preparation for future requests, and an information requesting means for requesting information from the information center; wherein the information requesting means includes a detecting means for detecting whether or not a desired piece of information is contained in the storing means, and a requesting means for outputting a request to the information center only when the detecting means has been unable to locate a desired piece of information in the storing means.

According to the seventeenth aspect of the present invention, an information center transmits information via a satellite communications or broadcasting channel as far as information at a layer of a depth in response to the number of requests for the same information from one or a plurality of satellite signal receiving terminals, receives and stores this in a storing means, and when searching for information first searches within its own storing means before executing a request to the above-mentioned information center.

In order to solve the above-mentioned problems, an eighteenth aspect of the present invention is a satellite communications or broadcasting system for transmitting information sent from an information center to a satellite signal receiving terminal via a satellite communications or broadcasting channel, wherein the information center includes an identifier allocating portion for allocating an identifier to the information based on the content of the information, a request number allocating means for allocating a request number showing the number of requests for the information from the satellite signal receiving terminal, a transmitting means for transmitting via a satellite communications or broadcasting channel the information to which the identifier and the request number have been allocated; and wherein the satellite signal receiving terminal includes a selecting means for selecting a desired piece of information based on the identifier from the information which has transmitted, a request number displaying means for recognizing a request number allocated to the information selected by the selecting means and displaying this request number.

According to the eighteenth aspect of the present invention, the information center allocates to layered information an identifier showing the contents thereof and data showing the number of requests made for this information or an identifier showing the contents thereof and executes transmission via a satellite communications or broadcasting channel; and each of the satellite signal receiving terminals acknowledges the above-mentioned identifier showing contents and the number of requests or an identifier showing the above-mentioned contents irrespective of whether or not each of the satellite signal receiving terminals has itself executed a request.

In order to solve the above-mentioned problems, a nineteenth aspect of the present invention is a satellite signal receiving terminal for receiving via a satellite communications or broadcasting channel transmitted information to which an identifier showing the information contents and a request number showing the number of requests for the information have been allocated, the information being transmitted by an information center, wherein the satellite signal receiving terminal includes a selecting means for selecting a desired piece of information based on the identifier from the information which has transmitted, and a request number displaying means for recognizing a request number allocated to the information selected by the selecting means and displaying this request number.

According to the nineteenth aspect of the present invention, an information center allocates to layered information an identifier showing the contents thereof and data showing the number of requests made for this information or an identifier showing the contents thereof and executes transmission via a satellite communications or broadcasting channel; and each of the satellite signal receiving terminals are capable of displaying acknowledgement of the above-mentioned identifier showing contents and the number of requests or an identifier showing the above-mentioned contents irrespective of whether or not each of the satellite signal receiving terminals has itself executed a request.

In order to solve the above-mentioned problems, a twentieth aspect of the present invention is a satellite communications or broadcasting system for transmitting information sent from an information center to a satellite signal receiving terminal via a satellite communications or broadcasting channel, wherein the information center includes a region identifier allocating means for allocating a region identifier for the information to be transmitted showing the region to which that information is to be transmitted, a transmitting means for transmitting via a satellite communications or broadcasting channel the information to which the region identifier has been allocated by the region identifier allocating means; and wherein the satellite signal receiving terminal includes a selective receiving means for receiving only the information which includes a region identifier showing the region in which this satellite signal receiving terminal is positioned.

According to the twentieth aspect of the present invention, an information center allocates to layered information an identifier showing the contents thereof, adds a region identifier specifying a region to which this information is to be transmitted and executes transmission; and only a satellite signal receiving terminal in a specified region receives the transmitted information based on the region identifier and selects information based on the identifier showing the contents thereof.

In order to solve the above-mentioned problems, a twenty-first aspect of the present invention is a satellite communications or broadcasting system in an alteration of the eighteenth aspect of the present invention for transmitting information sent from an information center to a satellite signal receiving terminal via a satellite communications or broadcasting channel, wherein the information center includes an region identifier allocating means for allocating to one portion of the information to be transmitted a region identifier showing the region to which the information is to be transmitted, a transmitting means for combining one portion of the information to which the region identifier has been allocated and the information for which no region identifier has been allocated and transmitting them via a satellite communications or broadcasting channel; and wherein the satellite signal receiving terminal includes a selective receiving means for receiving only the information which includes a region identifier showing the region in which this satellite signal receiving terminal is positioned or only the information for which no region identifier has been allocated.

According to the twenty-first aspect of the present invention, an information center combines and transmits information to which an identifier showing contents has been allocated and information which differs from the above-mentioned information to which an identifier showing content and a region identifier have been added; and a plurality of satellite signal receiving terminals receives and selects information based on the region identifier and the identifier showing contents.

In order to solve the above-mentioned problems, a twenty-second aspect of the present invention is a satellite signal receiving terminal for receiving from an information center via a satellite communications or broadcasting channel transmitted information to which a region identifier showing the transmission region has been allocated, wherein the satellite signal receiving terminal includes a selective receiving means for receiving only the information which includes a region identifier showing the region in which this satellite signal receiving terminal is positioned.

According to the twenty-second aspect of the present invention, information is received and selected based on the above-mentioned region identifier.

In order to solve the above-mentioned problems, a twenty-third aspect of the present invention is a satellite communications or broadcasting system for transmitting information sent from an information center to a satellite signal receiving terminal via a satellite communications or broadcasting channel, wherein the information center includes a content identifier allocating means for allocating a content identifier to the information to be transmitted based upon the content of that information, and for creating B mode information, a receiving terminal identifier allocating means for allocating a receiving terminal identifier to information requested from the information center by the satellite signal receiving terminal showing a satellite signal receiving terminal to which that information is to be transmitted, and for creating P mode information, and a transmitting means for combining B mode information and P mode information and transmitting them via a satellite communications or broadcasting channel; and wherein the satellite signal receiving terminal includes a B mode selective receiving means for receiving only information designated by the terminal itself based upon the content identifier included in the transmitted B mode information, a P mode selective receiving means for receiving only information designated by the terminal itself based upon the content identifier included in the transmitted P mode information.

According to the twenty-third aspect of the present invention, an information center combines and transmits information to which an identifier showing contents has been allocated and information which differs from the above-mentioned information to which a satellite signal receiving terminal identifier apportioned beforehand for each satellite signal receiving terminal has been added; and a plurality of satellite signal receiving terminals receives and selects information based on the content identifier and the receiving terminal identifier.

In order to solve the above-mentioned problems, a twenty-fourth aspect of the present invention is a satellite signal receiving terminal for receiving B mode information having a content identifier allocated based upon the content of the information and P mode information having an receiving terminal identifier allocated to show the satellite signal receiving terminal to which the information is to be transmitted from an information center via a satellite communications or broadcasting channel, wherein the satellite signal receiving terminal includes a B mode selective receiving means for receiving only information designated by the terminal itself based upon the content identifier included in the transmitted B mode information, a P mode selective receiving means for receiving only information designated by the terminal itself based upon the content identifier included in the transmitted P mode information; and wherein the satellite signal receiving terminal dispenses a service by chronological combining of the B mode information and the P mode information.

According to the twenty-fourth aspect of the present invention, an information center combines and transmits B mode information and P mode information, and configures a service by chronologically combining the above-mentioned B mode information and P mode information.

In order to solve the above-mentioned problems, a twenty-fifth aspect of the present invention is a satellite communications or broadcasting system of the twenty-third aspect of the present invention, wherein the information center includes a counting means for counting the number of requests of P mode information carried out by the satellite signal receiving terminal; and wherein the transmitting means includes a determining means for determining a combining ratio for the B mode information and the P mode information based on the number of requests counted by the counting means, a ratio transmitting means for combining the B mode information and the P mode information according to the combining ratio determined by the determining means and transmitting them via a satellite communications or broadcasting channel.

According to the twenty-fifth aspect of the present invention, an information center combines B mode information and P mode information and in addition alters the proportion of B mode information and P mode information in response to the number of requests for P mode information and executes transmission, and configures a service by chronologically combining the above-mentioned B mode information and P mode information.

In order to solve the above-mentioned problems, a twenty-sixth aspect of the present invention is a satellite communications or broadcasting system of the twenty-third aspect of the present invention, wherein the information center includes a cyclical transmitting means for repeatedly transmitting the B mode information in part or in whole.

According to the twenty-sixth aspect of the present invention, an information center combines B mode information and P mode information and in addition repeats and cyclically transmits the B mode information in part or in whole, and configures a service by chronologically combining the above-mentioned B mode information and P mode information.

In order to solve the above-mentioned problems, a twenty-seventh aspect of the present invention is a satellite communications or broadcasting system of the twenty-third aspect of the present invention, wherein the information center includes a combined frame creating means for creating a combined frame in which the B mode information and the P mode information have been combined, and the transmitting means transmits the combined frame.

According to the twenty-seventh aspect of the present invention, an information center combines and transmits within a single frame information to which an identifier has been allocated and information which differs from this information to which a satellite signal receiving terminal identifier apportioned beforehand for each satellite signal receiving terminal has been added. A layer identifier or the like is appropriate as the above-mentioned identifier.

In order to solve the above-mentioned problems, a twenty-eighth aspect of the present invention is a satellite communications or broadcasting system of the twenty-third aspect of the present invention, wherein the information center includes a B mode frame creating means for creating a B mode frame including only the B mode information, and a P mode frame creating means for creating a P mode frame including only the P mode information; and the transmitting means combines and transmits the B mode frame and the P mode frame.

According to the twenty-eighth aspect of the present invention, an information center organizes and deems as a separate frame information to which an identifier showing the content thereof (for instance a layer identifier) has been allocated, organizes and deems as a separate frame information which differs from this information to which a satellite signal receiving terminal identifier apportioned beforehand for each satellite signal receiving terminal has been added, combines these frames and transmits them.

In order to solve the above-mentioned problems, a twenty-ninth aspect of the present invention is a satellite communications or broadcasting system of the twenty-third aspect of the present invention, wherein the information center includes a B mode program creating means for supplying only the B mode information to a designated program and creating a program including only B mode information, and a P mode program creating means for supplying only the P mode information to another designated program and creating a program including only P mode information; and wherein the transmitting means combines and transmits the B mode program and the P mode program.

According to the twenty-ninth aspect of the present invention, an information center organizes information to which an identifier (for instance a layer identifier) has been allocated and sends it to a single program (in the present text, "channel" and "program" are interchangeable. Therefore, the present invention is valid even if "channel" is substituted with "program.") The information center then organizes and deems as a separate program information which differs from this information to which a satellite signal receiving terminal identifier apportioned beforehand for each satellite signal receiving terminal has been added, combines these programs and executes transmits.

In order to solve the above-mentioned problems, a thirtieth aspect of the present invention is a satellite communications or broadcasting system for transmitting information sent from an information center to a satellite signal receiving terminal via a satellite communications or broadcasting channel, wherein the satellite signal receiving terminal includes a requesting means for requesting the information center via a ground circuit to the effect that the satellite signal receiving terminal wants to receive the information, a judging means for judging whether or not P mode information transmitted from the information center is information transmitted to the terminal itself based on the receiving terminal identifier included in the P mode information; and wherein the information center includes a delivering means for delivering a designated receiving terminal identifier to the satellite signal receiving terminal via a ground circuit in response to a request in a case where there has been a request from the satellite signal receiving terminal, a receiving terminal identifier allocating means for allocating the delivered receiving terminal identifier to a designated information and for creating P mode information, and a transmitting means for transmitting the P mode information via a satellite communications or broadcasting channel.

According to the thirtieth aspect of the present invention, a satellite signal receiving terminal attempting to receive information being transmitted via a satellite communications or broadcasting channel requests reception to an information center via a ground circuit; after receiving this request the information center notifies the relevant satellite signal receiving terminal of its receiving terminal identifier via a ground circuit and also adds the relevant receiving terminal identifier to the information which it is preparing to transmit then executes transmission; and the relevant satellite signal receiving terminal selects information destined for its terminal using the above-mentioned receiving terminal identifier.

In order to solve the above-mentioned problems, a thirty-first aspect of the present invention is a satellite communications or broadcasting system for transmitting information sent from an information center to a satellite signal receiving terminal via a satellite communications or broadcasting channel, wherein the information center includes a content identifier allocating means for allocating a content identifier to the information to be transmitted based upon the content of that information, and for creating B mode information, a content region identifier allocating means for allocating an identifier to information to be transmitted based on a region identifier showing the region to which the information is to be transmitted and on the content of that information, and for creating A mode information, a receiving terminal identifier allocating means for allocating a receiving terminal identifier to information requested from the information center by the satellite signal receiving terminal showing a satellite signal receiving terminal to which that information is to be transmitted and for creating P mode information, and a transmitting means for combining and transmitting the B mode information and the A mode information and the P mode information via satellite communications or broadcasting channel; and wherein the satellite signal receiving terminal includes a B mode selective receiving means for receiving only information which is desired by the terminal itself based on the content identifier included in the transmitted B mode information, an A mode selective receiving means for receiving only the information which includes the region identifier showing the region in which the terminal itself is positioned based on the region identifier included in the transmitted A mode information, and a P mode selective receiving means for receiving only the information which has been transmitted to the terminal itself based on the receiving terminal identifier included in the transmitted P mode information.

According to the thirty-first aspect of the present invention, an information center combines information to which an identifier (for instance a layer identifier) has been allocated and information which differs from the above-mentioned information to which an identifier and a region identifier have been added and the above-mentioned receiving terminal identifier, and executes transmission; a plurality of satellite signal receiving terminals receive and select the information based on the above-mentioned region identifier and the above-mentioned identifier.

In order to solve the above-mentioned problems, a thirty-second aspect of the present invention is a satellite signal receiving terminal of the twenty-fourth aspect of the present invention, including a display means for executing a display to the effect that the P mode information is being received when the P mode selective receiving means is receiving the P mode information.

According to the thirty-second aspect of the present invention, while a satellite signal receiving terminal is receiving information to which a receiving terminal identifier has been added, this fact is displayed on the screen.

In order to solve the above-mentioned problems, a thirty-third aspect of the present invention is a satellite signal receiving terminal for receiving information transmitted via a satellite communications or broadcasting channel by an information center, wherein the satellite signal receiving terminal includes a collecting means for collecting information presently being displayed on a screen and at least one portion of information having contents relating to information presently being displayed on a screen, and a display means to display the information collected in the collecting means on the screen when a request has been given by an operator to display information collected by the collecting means on the screen.

According to the thirty-third aspect of the present invention, a satellite signal receiving terminal has a link to screen information presently being displayed on the screen and the above-mentioned present screen information and the contents thereof; in other words, the satellite signal receiving terminal is collecting one portion of adjoining information contained in the screen.

In order to solve the above-mentioned problems, a thirty-fourth aspect of the present invention is a satellite communications method for transmitting information sent from an information center to a satellite signal receiving terminal via a satellite communications or broadcasting channel, wherein the information center includes an identifier allocating step for allocating an identifier to information requested from the information center by the satellite signal receiving terminal based on contents of that information, a transmitting step for transmitting via a satellite communications or broadcasting channel the information to which an identifier has been allocated in the identifier allocating step; and wherein the satellite signal receiving terminal includes a selecting step for selecting the information which has been requested by the satellite signal receiving terminal itself from the transmitted information based on the identifier.

The thirty-fourth aspect of the present invention is a method representation of the first aspect of the present invention and functions in the same way as the first aspect of the present invention.

In order to solve the above-mentioned problems, a thirty-fifth aspect of the present invention is a satellite communications method of the thirty-fourth aspect of the present invention, wherein the satellite signal receiving terminal includes a request sending step for sending the request via a ground circuit. The thirty-fifth aspect of the present invention is a method representation of the second aspect of the present invention and functions in the same way as the second aspect of the present invention.

In order to solve the above-mentioned problems, a thirty-sixth aspect of the present invention is a satellite communications method of the thirty-fourth aspect of the present invention, wherein the information center includes a request counting step for counting the number of requests for a designated piece of information, a transmission repetition determining step for determining the number of transmission repetitions of a designated piece of information based on the number of requests counted by the request counting step, and a transmitting step for transmitting the designated information only at the number of transmission repetitions determined by the transmission repetition determining step.

The thirty-sixth aspect of the present invention is a method representation of the third aspect of the present invention and functions in the same way as the third aspect of the present invention.

In order to solve the above-mentioned problems, a thirty-seventh aspect of the present invention is a satellite communications method of the thirty-sixth aspect of the present invention, wherein the information center includes an allocating step for allocating to the information to be transmitted only at the number of transmission repetitions determined by the transmission repetition determining step, or alternatively, at the number of repetitions remaining when information having contents identical to that of the designated information; and the satellite signal receiving terminal includes a re-transmission judging step for referring to the remaining number of transmissions allocated to the transmitted information, or alternatively, to the number of repetitions to be transmitted, and for judging whether or not the designated information is to be re-transmitted.

The thirty-seventh aspect of the present invention is a method representation of the fourth aspect of the present invention and functions in the same way as the fourth aspect of the present invention.

In order to solve the above-mentioned problems, a thirty-eighth aspect of the present invention is a satellite communications method of the thirty-fourth aspect of the present invention, wherein the information center includes a dividing step for dividing into packet data the information to which an identifier has been allocated in the identifier allocating step, a transmission number allocating step for allocating to the packet data the identifier and the number of transmission repetitions fixed in response to the number of requests for this information or the remaining number of transmissions, and for supplying this packet data after allocating to the transmitting step; and wherein the satellite signal receiving terminal includes a reconstituting step for integrating the transmitted information divided into packet data and reconstituting original information, and a re-transmitting judging step for judging the existence of re-transmission of the information based on the number of transmissions allocated to reconstituted data or the remaining number of transmissions.

The thirty-eighth aspect of the present invention is a method representation of the sixth aspect of the present invention and functions in the same way as the sixth aspect of the present invention.

In order to solve the above-mentioned problems, a thirty-ninth aspect of the present invention is a satellite communications method of the thirty-fourth aspect of the present invention, wherein the information center includes a dividing step for dividing into packet data the information to which an identifier has been allocated in the identifier allocating step, a transmission number allocating step for allocating to one portion only within a plurality of packet data following dividing the identifier and the number of transmission repetitions fixed in response to the number of requests for this information or the remaining number of transmissions, and for supplying this packet data after allocating to the transmitting step; and wherein the satellite signal receiving terminal includes a reconstituting step for integrating the transmitted information divided into packet data, and reconstituting original information, and a re-transmitting judging step for judging the existence of re-transmission of the information based on the number of transmissions allocated to one portion of the plurality of packets which were storing the reconstituted information or the remaining number of transmissions.

The thirty-ninth aspect of the present invention is a method representation of the eighth aspect of the present invention and functions in the same way as the eighth aspect of the present invention.

In order to solve the above-mentioned problems, a fortieth aspect of the present invention is an information center transmitting apparatus for transmitting designated information via a satellite communications or broadcasting channel, wherein the information center transmitting apparatus includes an identifier allocating means for allocating an identifier to information requested from the information center by the satellite signal receiving terminal based on the content of that information, a transmitting means for transmitting via a satellite communications or broadcasting channel the information to which the identifier has been allocated by the identifier allocating means, a request counting means for counting the number of requests for a designated piece of information, a transmission repetition number determining means for determining the number of transmission repetitions of a designated piece of information based on the number of requests counted by the request counting means, a transmitting means for transmitting the designated information only at the number of transmission repetitions determined by the transmission number repetition determining means, and an allocating means for allocating to the information to be transmitted when the designated information is transmitted only at the number of transmission repetitions determined by the transmission repetition number determining means either the remaining number of times which information having content identical to that of the designated information is to be transmitted, or alternatively, the number of repetitions of that information to be transmitted.

The fortieth aspect of the present invention is a representation of the above-mentioned fourth aspect of the present invention as an information server and functions in the same way as the fourth aspect of the present invention.

In order to solve the above-mentioned problems, a forty-first aspect of the present invention is a satellite communications method for transmitting information sent from an information center to a satellite signal receiving terminal via a satellite communications or broadcasting channel, wherein the information center includes a dividing step for dividing information to be transmitted into a plurality of frames, a sequence number allocating step for allocating a sequence number showing the sequence of each division of the information, and an identifier based on the content of each division of the information, to each frame, a repetition transmitting step for repeatedly transmitting each frame to which a sequence number has been allocated to a satellite communications or broadcasting channel; and wherein the satellite signal receiving terminal includes a reconstituting step for reconstituting original information by arranging divided information included in each frame based on the sequence number allocated to each repeatedly transmitted frame.

The forty-first aspect of the present invention is a method representation of the tenth aspect of the present invention and functions in the same way as the tenth aspect of the present invention.

In order to solve the above-mentioned problems, a forty-second aspect of the present invention is a satellite communications method for transmitting information sent from an information center to a satellite signal receiving terminal via a satellite communications or broadcasting channel, wherein the information center includes a dividing step for dividing information to be transmitted into a plurality of packets, a sequence number allocating step for allocating to each packet a sequence number showing the sequence of each division of the information, a repetition transmitting step for repeatedly transmitting each packet to which a sequence number has been allocated to a satellite communications or broadcasting channel; and wherein the satellite signal receiving terminal includes a reconstituting step for reconstituting original information by arranging divided information included in each packet based on the sequence number allocated to each repeatedly transmitted packet, and a selecting step for selecting a desired piece of information from the reconstituted information based on the identifier.

The forty-second aspect of the present invention is a method representation of the eleventh aspect of the present invention and functions in the same way as the eleventh aspect of the present invention.

In order to solve the above-mentioned problems, a forty-third aspect of the present invention is a n information center transmitting apparatus for transmitting information to a satellite signal receiving terminal via a satellite communications or broadcasting channel, wherein the information center transmitting apparatus includes a dividing means for dividing information to be transmitted into a plurality of frames, a sequence number allocating means for allocating to each frame a sequence number showing the sequence of each division of the information, a repetition transmitting means for repeatedly transmitting each frame to which a sequence number has been allocated to a satellite communications or broadcasting channel.

The forty-third aspect of the present invention is a representation of the twelfth aspect of the present invention as an information center and functions in the same way as the twelfth aspect of the present invention.

In order to solve the above-mentioned problems, a forty-fourth aspect of the present invention is an information center transmitting apparatus for transmitting information to a satellite signal receiving terminal via a satellite communications or broadcasting channel, wherein the information center transmitting apparatus includes a dividing means for dividing information to be transmitted into a plurality of packets, a sequence number allocating means for allocating to each packet a sequence number showing the sequence of each division of the information and an identifier based on the content of the information, a repetition transmitting means for repeatedly transmitting each packet to which a sequence number has been allocated to a satellite communications or broadcasting channel.

The forty-fourth aspect of the present invention is a representation of the thirteenth aspect of the present invention as an information center and functions in the same way as the thirteenth aspect of the present invention.

In order to solve the above-mentioned problems, a forty-fifth aspect of the present invention is a satellite communications method for transmitting information sent from an information center to a satellite signal receiving terminal via a satellite communications or broadcasting channel, wherein the information center includes a managing step for managing information to be transmitted with a layered hierarchy, a No. 1 layer identifier allocating step for allocating a layer identifier to a piece of information requested from the information center by the satellite signal receiving terminal based on the layer of that information, a No. 2 layer identifier allocating step for allocating a layer identifier to a piece of information at an even lower layer than a piece of information requested from the information center by the satellite signal receiving terminal based on that lower layer, a transmitting step for transmitting via a satellite communications or broadcasting channel the information to which a layer identifier has been allocated by the No. 1 layer identifier allocating step and the lower information to which a lower layer identifier has been allocated by the No. 2 layer identifier allocating step; and wherein the satellite signal receiving terminal includes a selecting step for selecting the information which has been requested by the terminal itself from the transmitted information based on the layer identifier, and a storing step for storing the lower information transmitted by the information center in preparation for future requests.

The forty-fifth aspect of the present invention is a method representation of the fourteenth aspect of the present invention and functions in the same way as the fourteenth aspect of the present invention.

In order to solve the above-mentioned problems, a forty-sixth aspect of the present invention is an information center transmitting apparatus for transmitting designated information to a satellite signal receiving terminal via a satellite communications or broadcasting channel, wherein the information center transmitting apparatus includes a managing means for managing information to be transmitted with a layered hierarchy, a No. 1 layer identifier allocating means for allocating a layer identifier to a piece of information requested from the information center by the satellite signal receiving terminal based on the layer of that information managed in all periods, a No. 2 layer identifier allocating means for allocating a layer identifier to a piece of information at an even lower layer than a piece of information requested from the information center by the satellite signal receiving terminal based on that lower layer; and wherein a transmitting means for transmitting via a satellite communications or broadcasting channel the information to which a layer identifier has been allocated by the No. 1 layer identifier allocating means and the lower information to which a lower layer identifier has been allocated by the No. 2 layer identifier allocating means.

The forty-sixth aspect of the present invention is a representation of the fourteenth aspect of the present invention as an information center and functions in the same way as the fourteenth aspect of the present invention.

In order to solve the above-mentioned problems, a forty-seventh aspect of the present invention is a satellite communications method of the forty-fifth aspect of the present invention, wherein the No. 2 layer identifier allocating step includes a counting step for counting the number of requests for information, a multi-layer identifier allocating step, which is a means of allocating a layer identifier to information at a lower layer than the information which has been requested, for allocating a layer identifier to information at all layers lower than a depth based on the number counted by the counting step; and wherein the transmitting step transmits via a satellite communications or broadcasting channel the information to which a layer identifier has been allocated by the No. 1 layer identifier allocating step and a plurality of information at lower layers to which a lower layer identifier has been allocated by the No. 2 layer identifier allocating step.

The forty-seventh aspect of the present invention is a method representation of the sixteenth aspect of the present invention and functions in the same way as the sixteenth aspect of the present invention.

In order to solve the above-mentioned problems, a forty-eighth aspect of the present invention is an information center transmitting apparatus of the forty-sixth aspect of the present invention, wherein the No. 2 layer identifier allocating means includes a counting means for counting the number of requests for information, a multi-layer identifier allocating means, which is a means of allocating a layer identifier to information at a lower layer than the information which has been requested, for allocating a layer identifier to information at all layers lower than a depth based on the number counted by the counting means; and wherein the transmitting means transmits via a satellite communications or broadcasting channel the information to which a layer identifier has been allocated by the No. 1 layer identifier allocating means and a plurality of information at lower layers to which a lower layer identifier has been allocated by the No. 2 layer identifier allocating means.

The forty-eighth aspect of the present invention is a representation of the sixteenth aspect of the present invention as an information center and functions in the same way as the sixteenth aspect of the present invention.

In order to solve the above-mentioned problems, a forty-ninth aspect of the present invention is a satellite communications method for transmitting information sent from an information center to a satellite signal receiving terminal via a satellite communications or broadcasting channel, wherein the information center includes an identifier allocating step for allocating an identifier to information requested from the information center by the satellite signal receiving terminal based on contents of that information, a request number allocating step for allocating to the information a request number showing the number of requests from the satellite signal receiving terminal for that information, a transmitting step for transmitting via a satellite communications or broadcasting channel the information to which the identifier and the request number have been allocated; and wherein the satellite signal receiving terminal includes a selecting step for selecting a desired piece of information from the transmitted information based on the identifier, and a request number displaying step for recognizing a request number allocated to the information selected by the selecting step and displaying this request number.

The forty-ninth aspect of the present invention is a method representation of the eighteenth aspect of the present invention and functions in the same way as the eighteenth aspect of the present invention.

In order to solve the above-mentioned problems, a fiftieth aspect of the present invention is an information center transmitting apparatus for transmitting designated information to a satellite signal receiving terminal via a satellite communications or broadcasting channel, wherein the information center transmitting apparatus includes an identifier allocating means for allocating an identifier to information requested from the information center by the satellite signal receiving terminal based on contents of that information, a request number allocating means for allocating to the information a request number showing the number of requests from the satellite signal receiving terminal for that information, and a transmitting means for transmitting via a satellite communications or broadcasting channel the information to which the identifier and the request number have been allocated.

The fiftieth aspect of the present invention is a method representation of the eighteenth aspect of the present invention as an information center and functions in the same way as the eighteenth aspect of the present invention.

In order to solve the above-mentioned problems, a fifty-first aspect of the present invention is a satellite communications method for transmitting information sent from an information center to a satellite signal receiving terminal via a satellite communications or broadcasting channel, wherein the information center includes a region identifier allocating step for allocating a region identifier to information to be transmitted showing a region to which that information is to be transmitted, a transmitting step for transmitting via a satellite communications or broadcasting channel the information to which the region identifier has been allocated; and the satellite signal receiving terminal includes a selecting step for selecting only the information which includes the region identifier showing the region in which this satellite signal receiving terminal is positioned.

The fifty-first aspect of the present invention is a method representation of the twentieth aspect of the present invention and functions in the same way as the twentieth aspect of the present invention.

In order to solve the above-mentioned problems, a fifty-second aspect of the present invention is an information center transmitting apparatus for transmitting designated information to a satellite signal receiving terminal via a satellite communications or broadcasting channel, wherein the information center includes a region identifier allocating means for allocating a region identifier to information to be transmitted showing a region to which that information is to be transmitted, a transmitting means for transmitting via a satellite communications or broadcasting channel the information to which the region identifier has been allocated.

The fifty-second aspect of the present invention is a representation of the twentieth aspect of the present invention as an information center and functions in the same way as the twentieth aspect of the present invention.

In order to solve the above-mentioned problems, a fifty-third aspect of the present invention is a satellite communications method for transmitting information sent from an information center to a satellite signal receiving terminal via a satellite communications or broadcasting channel, wherein the information center includes a content identifier allocating step for allocating a content identifier to the information to be transmitted based upon the content of that information and for creating B mode information, a receiving terminal identifier allocating step for allocating a receiving terminal identifier to information requested from the information center by the satellite signal receiving terminal showing a satellite signal receiving terminal to which that information is to be transmitted and for creating P mode information, a transmitting step for combining B mode information and P mode information and transmitting them via a satellite communications or broadcasting channel; and wherein the satellite signal receiving terminal includes a B mode selective receiving step for receiving only information desired by the terminal itself based upon the content identifier included in the transmitted B mode information, a P mode selective receiving step for receiving only information designated by the terminal itself based upon the content identifier included in the transmitted P mode information.

The fifty-third aspect of the present invention is a method representation of the twenty-third aspect of the present invention and functions in the same way as the twenty-third aspect of the present invention.

In order to solve the above-mentioned problems, a fifty-fourth aspect of the present invention is an information center transmitting apparatus for transmitting designated information to a satellite signal receiving terminal via a satellite communications or broadcasting channel, wherein the information center transmitting apparatus includes a content identifier allocating means for allocating a content identifier to the information to be transmitted based upon the content of that information, and for creating B mode information, a receiving terminal identifier allocating means for allocating a receiving terminal identifier to information requested from the information center by the satellite signal receiving terminal showing a satellite signal receiving terminal to which that information is to be transmitted, and for creating P mode information, a transmitting means for combining B mode information and P mode information and transmitting them via a satellite communications or broadcasting channel.

The fifty-fourth aspect of the present invention is a representation of the twenty-third aspect of the present invention as an information center and functions in the same way as the twenty-third aspect of the present invention.

In order to solve the above-mentioned problems, a fifty-fifth aspect of the present invention is a satellite communications method for transmitting information sent from an information center to a satellite signal receiving terminal via a satellite communications or broadcasting channel, wherein the satellite signal receiving terminal includes a requesting step for requesting the information center via a ground circuit to the effect that the satellite signal receiving terminal wants to receive the information; and wherein the information center includes a delivering step for delivering a designated receiving terminal identifier to the satellite signal receiving terminal via a ground circuit in response to a request in a case where there has been a request from the satellite signal receiving terminal, a receiving terminal identifier allocating step for allocating the delivered receiving terminal identifier to a designated information and for creating P mode information, a transmitting step for transmitting the P mode information via a satellite communications or broadcasting channel, and a judging step for judging whether or not P mode information transmitted from the information center is information transmitted to the terminal itself based on the receiving terminal identifier included in the P mode information.

The fifty-fifth aspect of the present invention is a method representation of the thirtieth aspect of the present invention and functions in the same way as the thirtieth aspect of the present invention.

In order to solve the above-mentioned problems, a fifty-sixth aspect of the present invention is an information center transmitting apparatus for transmitting designated information to a satellite signal receiving terminal via a satellite communications or broadcasting channel, wherein the information center transmitting apparatus includes a delivering means for delivering a designated receiving terminal identifier to the satellite signal receiving terminal via a ground circuit in response to a request in a case where there has been a request from the satellite signal receiving terminal, a receiving terminal identifier allocating means for allocating the delivered receiving terminal identifier to a designated information and for creating P mode information, and a transmitting means for transmitting the P mode information via a satellite communications or broadcasting channel.

The fifty-sixth aspect of the present invention is a representation of the thirtieth aspect of the present invention as an information center and functions in the same way as the thirtieth aspect of the present invention.

In order to solve the above-mentioned problems, a fifty-seventh aspect of the present invention is a satellite signal receiving terminal for receiving via a satellite communications or broadcasting channel information sent from an information center, wherein the satellite signal receiving terminal includes a requesting means for requesting the information center via a ground circuit to the effect that the satellite signal receiving terminal wants to receive the information, and a judging means for judging whether or not P mode information transmitted from the information center is information transmitted to the terminal itself based on the receiving terminal identifier included in the P mode information.

The fifty-seventh aspect of the present invention is a representation of the thirtieth aspect of the present invention as a receiving terminal and functions in the same way as the thirtieth aspect of the present invention.

In order to solve the above-mentioned problems, a fifty-eighth aspect of the present invention is a satellite communications method for transmitting information sent from an information center to a satellite signal receiving terminal via a satellite communications or broadcasting channel, wherein the information center includes a content identifier allocating step for allocating a content identifier to the information to be transmitted based upon the content of that information, and for creating B mode information, a content region identifier allocating step for allocating an identifier to information to be transmitted based on a region identifier showing the region to which the information is to be transmitted and on the content of that information, and for creating A mode information, a receiving terminal identifier allocating step for allocating a receiving terminal identifier to information requested from the information center by the satellite signal receiving terminal showing a satellite signal receiving terminal to which that information is to be transmitted, and for creating P mode information, a transmitting step for combining and transmitting the B mode information and the A mode information and the P mode information via satellite communications or broadcasting channel; and wherein the satellite signal receiving terminal includes a B mode selective receiving step for receiving only information which is desired by the terminal itself based on the content identifier included in the transmitted B mode information, an A mode selective receiving step for receiving only the information which includes the region identifier showing the region in which the terminal itself is positioned based on the region identifier included in the transmitted A mode information, and a P mode selective receiving step for receiving only the information which has been transmitted to the terminal itself based on the receiving terminal identifier included in the transmitted P mode information.

The fifty-eighth aspect of the present invention is a method representation of the thirty-first aspect of the present invention and functions in the same way as the thirty-first aspect of the present invention.

In order to solve the above-mentioned problems, a fifty-ninth aspect of the present invention is an information center transmitting apparatus for transmitting designated information to a satellite signal receiving terminal via a satellite communications or broadcasting channel, wherein the information center transmitting apparatus includes a content identifier allocating means for allocating a content identifier to the information to be transmitted based upon the content of that information and for creating B mode information, a content and region identifier allocating means for allocating an identifier to information to be transmitted based on a region identifier showing the region to which the information is to be transmitted and on the content of that information and for creating A mode information, a receiving terminal identifier allocating means for allocating a receiving terminal identifier to information requested from the information center by the satellite signal receiving terminal showing a satellite signal receiving terminal to which that information is to be transmitted and for creating P mode information, and a transmitting means for combining and transmitting the B mode information and the A mode information and the P mode information via satellite communications or broadcasting channel.

The fifty-ninth aspect of the present invention is a representation of the thirty-first aspect of the present invention as an information center and functions in the same way as the thirty-first aspect of the present invention.

In order to solve the above-mentioned problems, a sixtieth aspect of the present invention is a satellite signal receiving terminal for receiving via a satellite communications or broadcasting channel information transmitted by an information center which is B mode information allocated based on the content of that information, A mode information allocated based on a region identifier showing a region to which that information is to be transmitted and a content identifier based on the content of the information showing the content, and P mode information to which a receiving terminal identifier showing a satellite signal receiving terminal to which that information is to be transmitted has been allocated, wherein the satellite signal receiving terminal includes a B mode selective receiving means for receiving only information which is desired by the terminal itself based on the content identifier included in the transmitted B mode information, an A mode selective receiving means for receiving only the information which includes the region identifier showing the region in which the terminal itself is positioned based on the region identifier included in the transmitted A mode information, and a P mode selective receiving means for receiving only the information which has been transmitted to the terminal itself based on the receiving terminal identifier included in the transmitted P mode information.

The sixtieth aspect of the present invention is a representation of the thirty-first aspect of the present invention as a receiving terminal and functions in the same way as the thirty-first aspect of the present invention.

DESCRIPTION OF THE PREFERRED EMBODIMENTS

Embodiment 1

Figure 2:
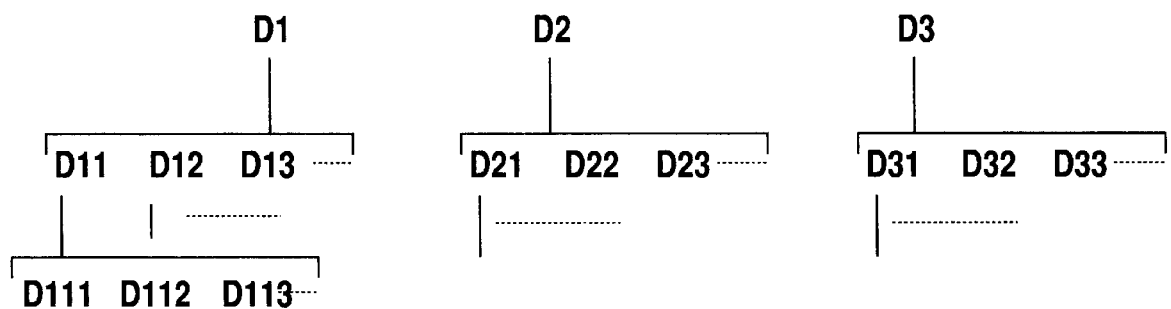
FIG. 2 is a diagram showing a layered structure of data.
Figure 3:
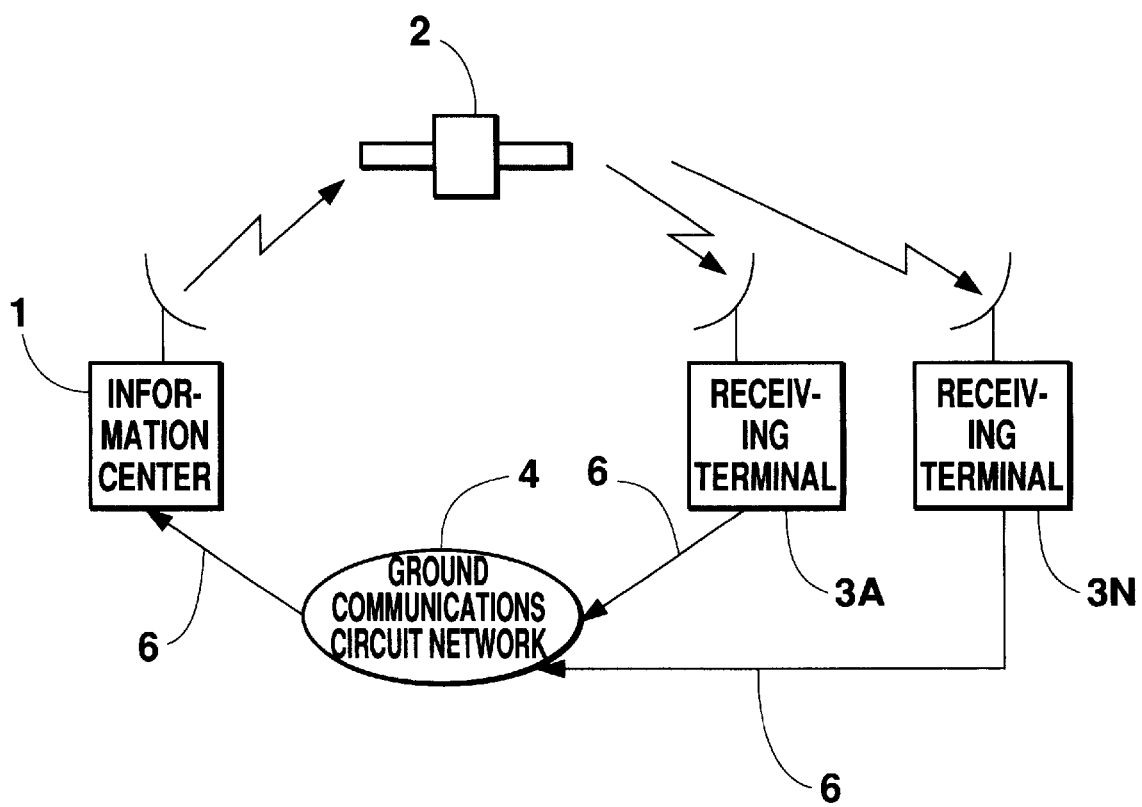
FIG. 3 is a block diagram depicting a satellite communications or broadcasting systems of this invention.

FIG. 3 shows a block diagram of a shopping system of the present invention in a first embodiment. 1 is an information center which allocates an information identifier corresponding to the content of shopping information which has been requested by a satellite signal receiving terminal, or alternatively, allocates a layer identifier if that shopping information is layered, and transmits the requested information toward a satellite; 2 is a satellite which receives the transmitted shopping data with a transponder and transmits it toward the ground; 3A~3N are satellite signal receiving terminals which receive and display on the ground transmitted shopping information and simultaneously view the displayed shopping information and make new requests for shopping information to the information center; 6 is a ground communications circuit connecting the satellite signal receiving terminals with the information center; 4 is a ground communications circuit network. FIG. 2 is a diagram depicting layered shopping information being stored in the information center 1; D1, D2, D3 . . . depict a first layer data group of the layered shopping information, for instance this could be a shopping menu classifying the main goods such as clothes or electrical goods. D11, D12, D13 . . . , D21, D22, D23 . . . , D31, D32, D33 . . . depict a second layer data group, for instance the classifications could be menswear, ladieswear, and childrenswear.

D 111, D112, D113 . . . depict a third layer data group, for instance groups such as coats, suits, trousers in the menswear section. Thereafter, layering continues similarly as necessary. When a layer identifier corresponding to data Dn is shown as dn, thus for instance where d21, d22, d23 . . . other than D2 are present within data D2, all the layer identifiers of the layer one layer below that data layer are written out. In the first embodiment, since a satellite signal receiving terminal which has requested D2 according to this type of data structure knows the layer identifiers of the lower layer, the satellite signal receiving terminal is able to receive the data having as its header that lower layer identifier which has been transmitted from the information center in compliance with that request.

Figure 1:
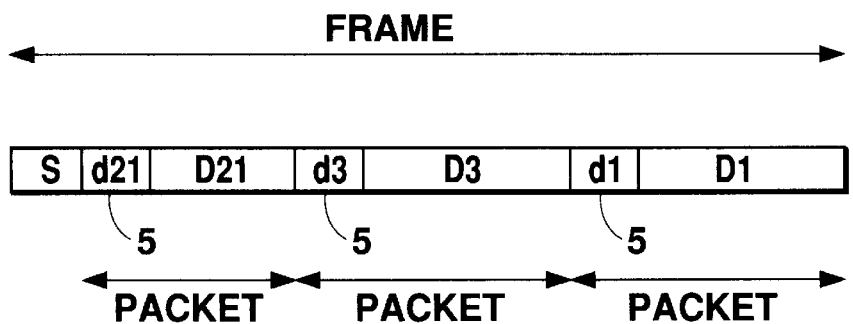
FIG. 1 is a diagram showing a frame configuration of the present invention.

Next, the operation when transmitting data layered in this way will be explained. First of all, the first layer data D1, D2, D3 . . . is downloaded from the information center through a satellite communications or broadcasting channel to all the satellite signal receiving terminals 3A~3N. The satellite signal receiving terminals 3A~3N select the data they want from the first layer data D1, D2, D3 . . . . To be precise, an operator selects the information he wants at the satellite signal receiving terminals. For instance, if data D2 is now selected at satellite signal receiving terminal 3A, a request for the lower data of D2, for example d21, is sent to the information center 1 from satellite signal receiving terminal 3A via the ground communications circuit network. When the information center 1 transmits the requested lower data D2 whose layer identifier is d21 via a satellite communications or broadcasting channel, it allocates a layer identifier d21 of the data D21 to the header for the receiving satellite signal receiving terminal and writes this in the frame. The configuration of this frame is shown in FIG. 1. Hereafter, a packet of the kind shown in FIG. 1 having a layer identifier which is an identifier corresponding to the contents of the data is referred to as a broadcasting mode (abbreviated to B mode) packet. S is frame synchronizing signal for synchronizing continuous packets and frames, D21 is the second layer data of D2, and d21 is the layer identifier of D21. Since the satellite signal receiving terminal 3A knows the layer identifier of the requested lower data of D2, it recognizes the layer identifier d21 within the frame transmitted on the satellite circuit and picks out the data D21. FIG. 1 here depicts a case in which D21 and packets of other layers are multiplied (they are included in the same frame) but a case is also conceivable in which data D22 and subsequent data following data D21 are multiplied.

Figure 4:
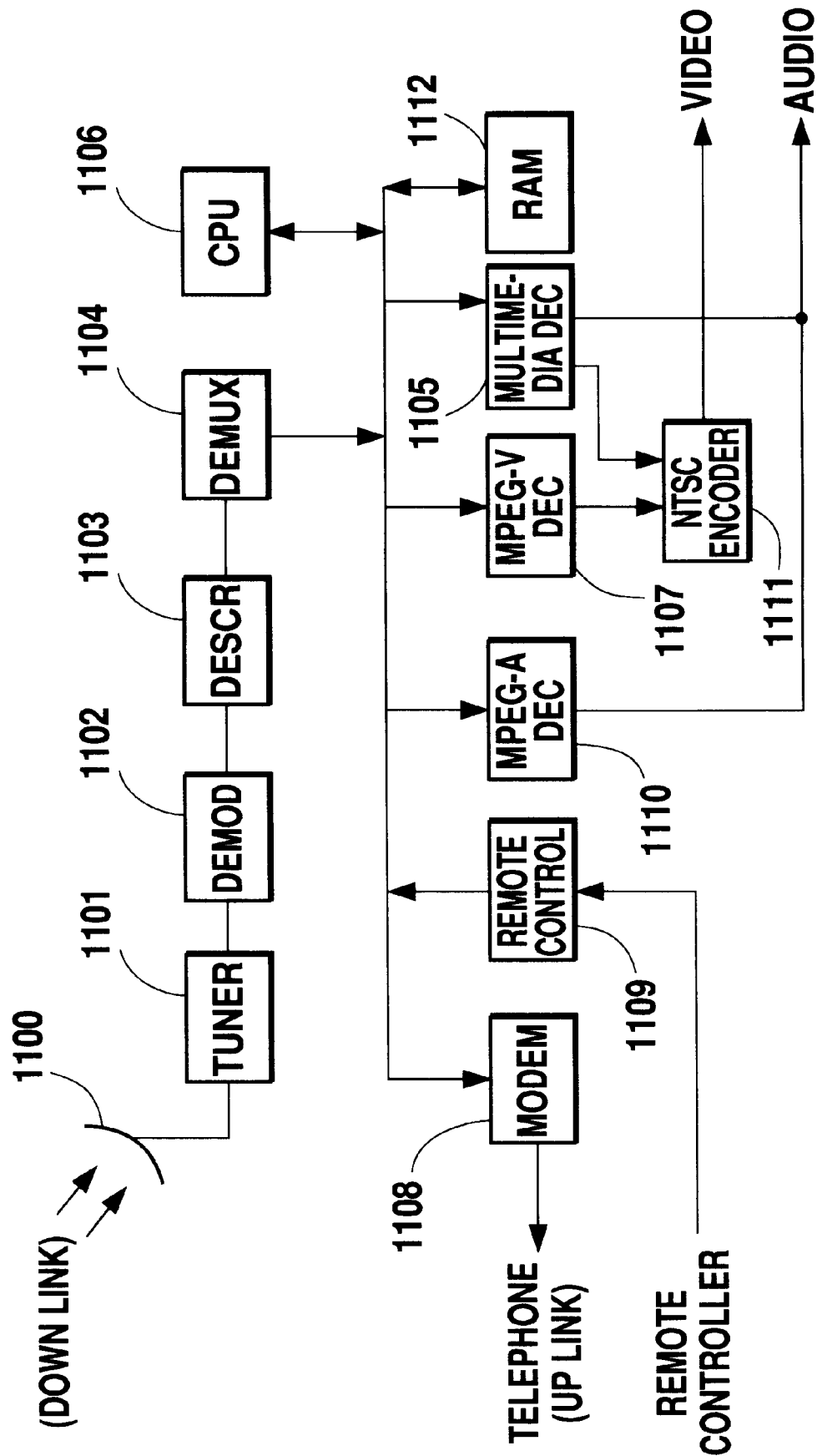
FIG. 4 is a block diagram depicting a satellite signal receiving terminal of this invention.

In order to explain the operation of FIG. 3 described above in more detail, the operation in a case in which one portion of a multi-channel digital satellite broadcasting channel utilizing a communications satellite is used in this shopping system will now be explained. By applying the present invention to a multi-channel digital satellite broadcasting system, in addition to broadcasts (one-way communications to an unspecified multitude) a two-way lifestyle information service can also be added to TV programs and the multi-channel digital satellite broadcasting system can be rendered more attractive, more beneficial and more in-touch with customers lifestyles. FIG. 4 shows a block diagram of a set top box (hereinafter abbreviated to STB) which is the main portion of the satellite signal receiving terminal 3A. In addition to this, the satellite signal receiving terminal comprises a TV monitor and a remote control device having functions such as pointing and clicking. As is well known, because digital satellite broadcasting is capable of transmitting a plurality of (digital broadcasting) programs, further to the earlier concept of a 1-channel analog broadcast, a plurality of programs exists among the radio waves which have been down-linked with an appropriate frequency band, for instance a Ku band. Consequently, when the radio waves are received by an antenna 1100, a tuner 1101 carries out tuning to the frequency (equivalent to 1 channel in a previous antenna broadcast; in a digital broadcast of the present embodiment a plurality of programs is included in 1 channel of an analog broadcast) of the transponder of the satellite which includes the program carrying out the shopping service presently being used. A digital modulating mode such as QPSK is used when digital data are broadcast and here DEMOD 1102 is the block for demodulating that. A digital signal group is obtained after passing through the DEMOD. Generally, in broadcasts using a communications satellite the broadcasting wave is coded and referred to as a scramble, and here the block for reading that code is the descrambler 1103 (DESCR).

Figure 5:
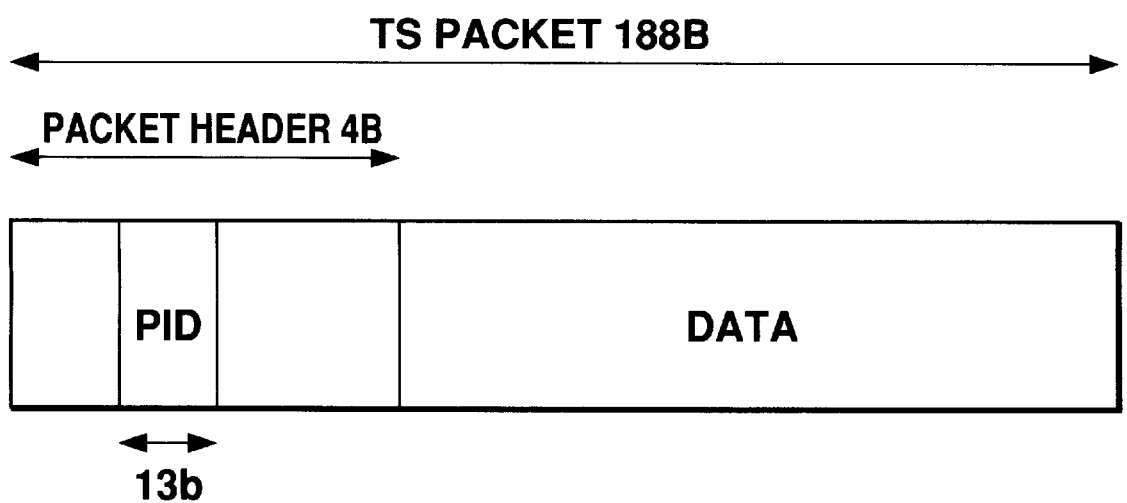
FIG. 5 is a configuration diagram of a TS packet.

In this system, in compliance with MPEG2 system regulations (ISO/IEC 13818), ordinary television broadcasts and shopping data are each transmitted using a fixed-length packet completed as a transport stream packet (TS packet) shown in FIG. 5. Selection of broadcast programs or shopping service programs or other lifestyle information service programs is carried out according to packet identifiers (PID) apportioned to each program.

DEMUX 1104 carries out this selection.

The plurality of TS packets constituting a shopping service program which has been selected in this way is stored in a RAM 1112, and converted by a CPU 1106 into a packet which is a single arrangement of information units comprising 1 screen (hereinafter referred to as a multimedia packet) such as that shown in FIG. 1, and the identifier (d21 in the present example) of the requested data (D21 in the present example) is searched for from among this multimedia packet. Next, the shopping information such as text data, still pictures and graphics is synthesized as single screen by a multimedia DEC 1105. MPEG-V DEC 1107 decodes the MPEG 2 moving image data and plays the TV broadcast program. MODEM 1108 is a modem for connecting requested information to a public telephone network as an up-link which transmits to the information center 1. REMOTE CONTROL 1109 is used for clicking and selecting icons and the like shown on the screen by remote control while viewing the screen. The information of a selected icon is sent to the information center 1 through a ground communications circuit by the modem 1108. In addition to the operation already described CPU 1106 is a CPU for controlling the whole or one part of the block in FIG. 4. MPEG-A 1110 decodes audio data compressed in accordance with MPEG 2 regulations. An NTSC encoder executes D/A conversion of one screen of digital image data created by DEC 1105, converts this to NTSC format and outputs it an NTSC TV image-receiving device. In addition to the operation already described, the application RAM 1112 is downloaded via a satellite communications or broadcasting channel prior to commencement of this shopping service with S/W (software) required in order to execute the service, for instance S/W for executing connection to a ground circuit or S/W for a GUI (graphical user interface). If the service type is altered, for instance to a banking service, the application S/W corresponding to the new service is downloaded to the terminal prior to commencement of that service.

Figure 6:
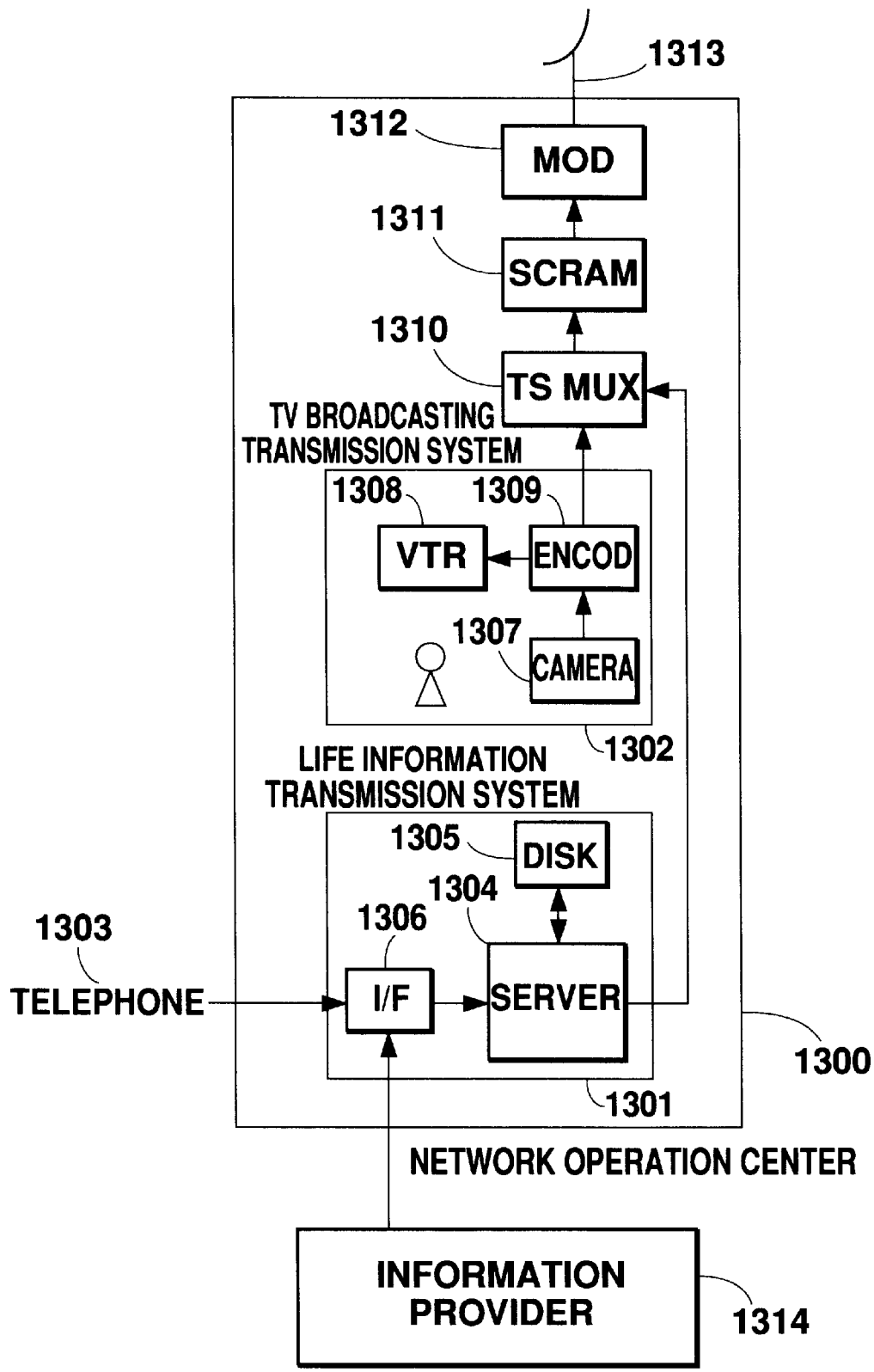
FIG. 6 is a block diagram depicting an information center of this invention.
Figure 7:
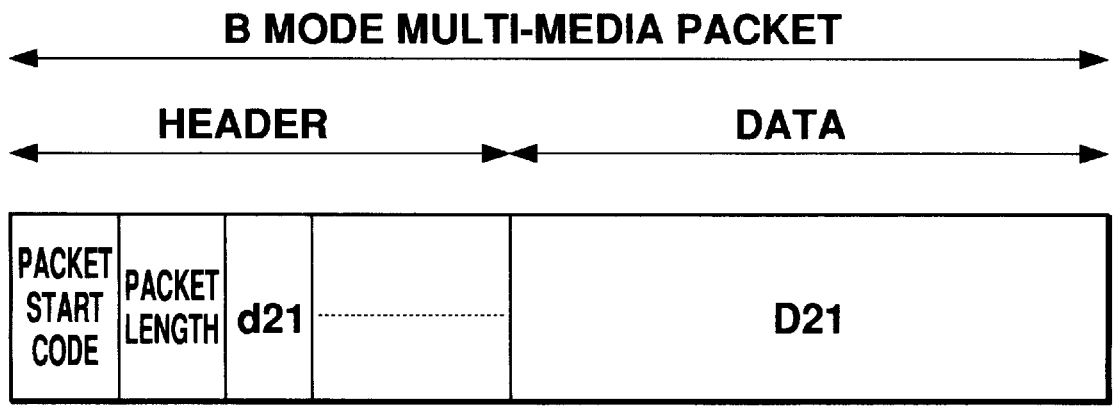
FIG. 7 is configuration diagram of a multimedia packet of this invention.

FIG. 6 is a system block diagram of the information center 1 in FIG. 3. 1300 is a network operation center (hereinafter abbreviated to NOC) comprising a lifestyle information transmitting system 1301 and a TV broadcast transmitting system 1302. 1314 is an information provider for providing a variety of lifestyle information such as shopping, banking affairs and community services. Every variety of information is stored via a special high-speed line in a disc 1305 of the NOC lifestyle information transmitting system 1301. Information from this information provider can also be provided via the INTERNET. In a case in which D21 such as that described in FIG. 2 is transmitted according to a request from a satellite signal receiving terminal received through a ground communications circuit, a server 1304 searches and locates the D21 stored onto a disc 1305 by the information provider 1314, allocates a header d21 corresponding to D21 and creates the multimedia packet shown in FIG. 1. A more detailed example of this multimedia packet is shown in FIG. 7. The multimedia packet is divided into a header portion and a data portion; for instance as with single-screen data a meaningful arrangement of data (the layered data D21 in the present example) is inserted into the data portion, and a packet start code showing the start of the multimedia packet, a packet length showing the length of the multimedia packet, a layer identifier (d21 in the present example) and if necessary other information are inserted into the header portion.

Since an identifier corresponding to the information content is allocated to the multimedia packet shown in FIG. 1 or FIG. 7, hereinafter this type of packet will be termed a B mode packet. There are no MPEG 2 stipulations pertaining to a packet-formatted meaningful arrangement of information of this type and thus each system can be optimized fully. In MPEG 2 regulations, this type of multimedia packet is divided and the fixed-length transmission packet and the TS packet shown in FIG. 5 are regulated by data transmission. In FIG. 6 this B mode multimedia packet is divided into the TS packet of FIG. 5 and supplied to a TSMUX 1310. At this time, a PID of this shopping service program is provided to the TS packet at a server 1304.

A TV broadcasting system 1302 compresses a moving image signal from a camera 1307 or a VTRI 1308 with an MPEG 2 encoder 1309, renders it into a length-variable packet termed a PES which is equivalent to a multimedia packet regulated by MPEG 2 system stipulations already defined above, which is then divided into TS packets for fixed-length transmission as shown in FIG. 5. A PID corresponding to a TV broadcasting program is now provided to the TS packets. This shopping program TS packets and TS packets for use with TV broadcasting programs are multiplied at a TS MUX 1310, coded by a scrambler 1311, at a MOD 1312 these digital signal groups are digitally modulated using QPSK or the like into a radio wave which will serve as the final carrier. The radio wave is then sent to the satellite by a transmitting antenna 1313. At the satellite the radio wave is amplified by a transponder and transmitted to a satellite signal receiving terminal on the ground. In compliance with a PID known from a previously transmitted program content list, the satellite signal receiving terminal picks out the TS packet holding the shopping service program PID with a DEMUX 1104 as already described, reverts it to a multimedia packet using CPU 1106 and RAM 1112, detects the d21 at the header portion and obtains the desired shopping data D21.

In general, shopping information includes best-selling products and it is envisaged that requests will be concentrated on data linked to these products. Therefore, when satellite signal receiving terminal 3B wishes to know data D21 almost simultaneously with satellite signal receiving terminal 3A, it checks the B mode packet data being transmitted on the satellite communications or broadcasting channel without having to make a separate request to the information center through the ground communications circuit network 4, and can take out the data D21 by recognizing the layer identifier d21.

Consequently, accessing time is shorter than in a case where a request is re-executed via the ground circuit to the information center, the circuit is no longer occupied by identical data, and satellite circuit efficiency increases. Moreover, puncturing of the circuit when permitted circuit capacity is exceeded due to an extremely large number of satellite signal receiving terminals individually requesting the same data at the same time can be avoided.

The operation whereby the satellite signal receiving terminal 3B searches for its desired data from among the data on the satellite signal without making a request to the information center for data 21 will now be described in more detail with reference to FIG. 4. As explained above, a plurality of programs generally exists within one tuned radio wave band. The DEMUX 1104 separates the shopping program from this plurality of programs by checking the PID of the TS packets. Thus all the shopping service data are sequentially inputted from DEMUX 1104 to a fixed region of a RAM 1112 and a fixed amount of earlier data is stored. RAM 1112 operates like the FIFO erased from the oldest data when new data are inputted. In other words, slightly earlier data is usually present in this RAM fixed region. When access to D21 is started by the remote control, CPU 1106 checks this stored data, and when the d21 multimedia packet has been detected it redirects the data to DEC 1105 where the data are decoded and converted to a display screen. In above explanation earlier data were stored in an RAM, but it is acceptable to monitor and search for data on a fixed-period radio wave signal without storing the data.

This first embodiment described a case in which shopping information was layered, but similar results are obtained if identifiers (hereinafter referred to as information identifiers) are allocated respectively to non-layered information having differing contents. This first embodiment described a case in which request information was transmitted to the information center 1 via a ground communications circuit by clicking an icon on the monitor screen of the satellite signal receiving terminal. A similar advantage can be brought when a user verbally transmits the request information using a telephone line.

Embodiment 2

When there are best-selling products, it is envisaged that at the same time as requests concentrate on the data linked to those products this concentrating time will be continuous.

A second embodiment of the present invention is intended to transmit the data of best-selling products in response to the number of requests repeatedly on satellite circuit and to add whether or not that data is to be repeated or the number of remaining repetitions, together with a layer identifier. A frame period or a period longer than this may be used as the repeating period, but in either case a repeating period is chosen which allows most rapid prior access to the information center.

In such a configuration, since a satellite signal receiving terminal can read out that data without making a request to the information center by confirming the existence or not of data repetitions or the remaining number of repetitions, accessing time is shortened and satellite circuit efficiency is increased.

Figure 8:
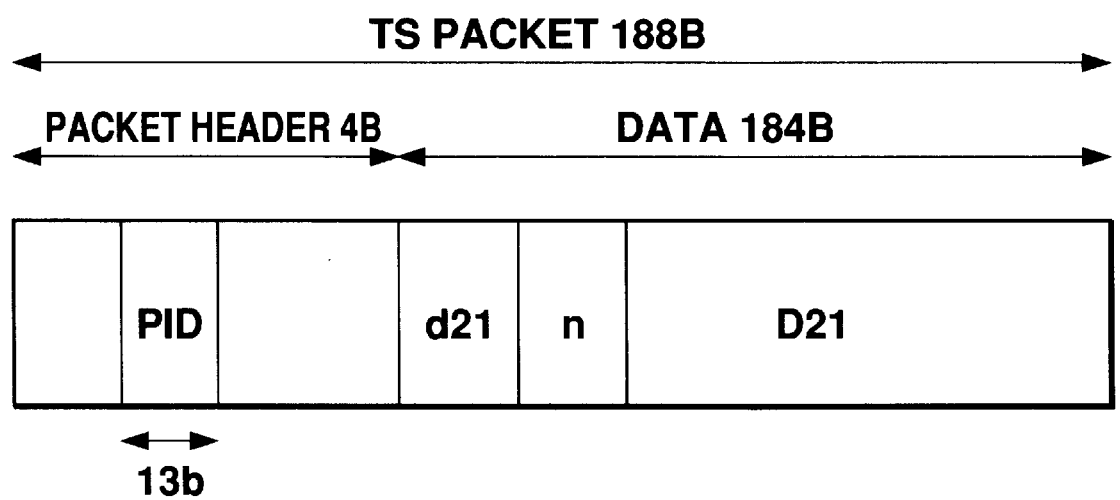
FIG. 8 is a configuration diagram depicting a TS packet of this invention.

In order to explain the above-mentioned second embodiment is greater detail an example using a TS packet will now be depicted. FIG. 8 shows the data structure of a TS packet at this stage. The structure of the multimedia packet is the same as the B mode packet described above in FIG. 7. In FIG. 8 the ID of this shopping service program is written as PID. d21 is a layer identifier inserted into the data region of the TS packet in order to identify the presence of layered D21 data in the TS packet. The n which follows it is a number of remaining repetitions added in response to the number of requests for data D21 during a fixed period. This fixed period is determined according to the life-span of each product, and so n is determined on the spot by a server within the NOC lifestyle information system in accordance with earlier data and the like corresponding with the number of requests at the sampling point. n is then added to the data region within the TS packet following the layer identifier. The divided layered data D21 follows this.

Figure 9:
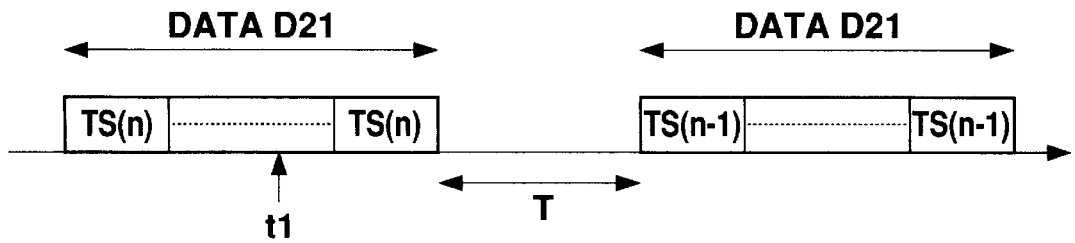
FIG. 9 is diagram depicting a data transmission of this invention.

FIG. 9 shows data D21 being sent by the server 1304 with a remaining number of repetition transmissions n and a repetition of the same data with a remaining number of repetitions n−1 separated by time T. The time T is set far less than the time required to access this data individually via a public telephone network. A satellite signal receiving terminal which desires the data D21 begins searching for the data on the satellite circuit with its own terminal; if for instance the TS packet of the RM 1112 in FIG. 7 at a point t1 is taken in, after n and the d21 in the data region of the TS packet are detected by the CPU 1106 in FIG. 4 and the RAM 1112, the satellite signal receiving terminal learns that the same information is to begin again from the start. In this case the satellite signal receiving terminal checks the data region of the TS packet holding the PID for this shopping service program selected by CPU 1106 using the DEMUX 1104 and is capable of detecting d21 and n. Thus the satellite signal receiving terminal does not have to request the data again through the public telephone channel and simply waits for D21 to begin its n−1 repetition to obtain the information. In this way, accessing of the same information can be carried out more rapidly than by individually accessing via a public telephone circuit network, and similarly a case can now be conceived of where a plurality of satellite signal receiving terminals is waiting for the n−1 transmission during the n transmission; in such a case, since the plurality of satellite signal receiving terminals can access the same data simultaneously, in comparison with a case where these satellite signal receiving terminals individually request data, which is transmitted via a public telephone circuit network, the satellite circuit efficiency is improved and there is no need to pay unnecessary fees for using the ground circuit.

In the above embodiment, identifiers and remaining transmission numbers were added to the data regions of all the TS packets comprising the B mode multimedia packet, but this information can also be added to a certain number only of the TS packets. This will result in a slightly longer accessing time, but since the 184B data region is not used in this information this has the effect of improving transmission efficiency. In addition, in the above embodiment an example was shown in which the satellite signal receiving terminal itself checked the number of remaining transmissions of the requested data at the point where the layered data was requested, but a similar result can be obtained if the satellite signal receiving terminal first checks the number of remaining transmissions of a layer deeper than the layer data presently being displayed before waiting for the data of the requested layer.

Embodiment 3

According to a third embodiment of the present invention, a single block of layered shopping information is comprised of a group of frames, but when this information is being transmitted via a repeating satellite circuit, a receiving terminal can read out desired data without accessing a information center 1 through a ground communications circuit. A case in which information such as text information, still picture information and audio information are separately inserted into a multimedia packet is an example of such a single block of layered shopping information comprising of a plurality of frames.

The information center 1 adds layer identifiers and numbers for the frames constituting the shopping information to the header 5 of the B mode multimedia packet. The satellite signal receiving terminal is provided with a collecting function for collecting received data, and when collecting has begun from a midway frame number, collecting is carried out as far as the packet of the frame number immediately preceding that number and rearrangement into the correct order is carried out prior to use. According to such a configuration, in comparison with a case in the information center is re-accessed (i.e. the receiving terminal waits until the first frame is transmitted), accessing time is shortened and the satellite circuit efficiency is improved.

Figure 10:
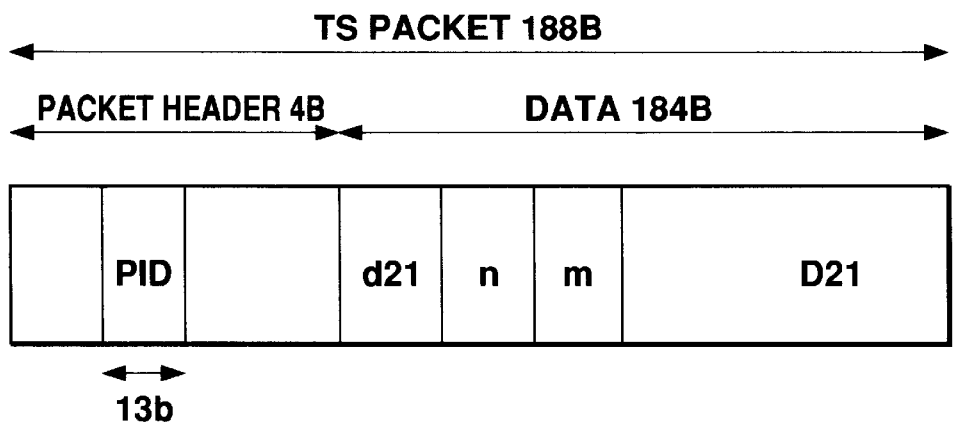
FIG. 10 is a configuration diagram depicting a TS packet of this invention.
Figure 11:
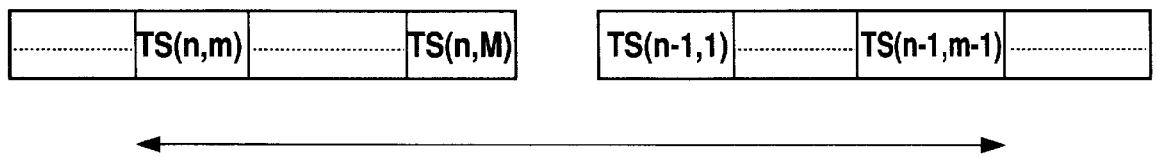
FIG. 11 is a diagram showing a collecting range of information of a satellite signal receiving terminal of this invention.

Next, a case in which a single block of shopping information is configured with a multimedia packet which is divided into a plurality of TS packets will be described. As FIG. 10 shows, a number m showing the order of data divided so as to fit the data D21 into the TS packet is added to the data region of the TS packet after the layer identifier d21 and the remaining number of repeating transmissions n explained above. The divided data D21 follows this. FIG. 11 shows a concentration of the TS packet of the n transmission data D21 and a concentration of the TS packet of the n−1 transmission data D21. The number of the shopping service program is written in the PID and so the satellite signal receiving terminal picks out only the TS packet of this shopping service program with the DEMUX 1104. Then, when the satellite signal receiving terminal has been able to access in the RAM 1112 the TS packet with this m number from among the nth data, the satellite signal receiving terminal collects this in the RAM; collection in the RAM for the n−1 transmission continues from the beginning as far as the m−1 TS (n−1, m−1), then the satellite signal receiving terminal rearranges and uses the data from the 1st data TS (n−1, 1) when redirecting it to the multimedia DEC 1105.

Figure 12:
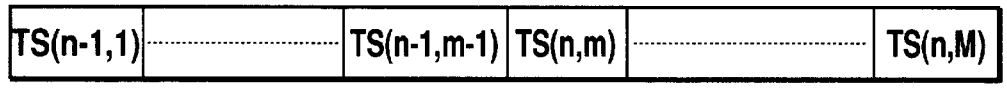
FIG. 12 is a diagram depicting a data configuration of a satellite signal receiving terminal of this invention.

In comparison with a case in which all the n−1 data is captured, by the above method the accessing time until displaying can be shortened. FIG. 12 shows the condition of the D21 data when it has been rearranged. In comparison with a case in which information has been requested individually, the improvement in the satellite circuit efficiency is the same as in the second embodiment.

Embodiment 4

According to a fourth embodiment of the present invention, an information center which has been accessed from a satellite signal receiving terminal simultaneously transmits with the data of the accessed layer the data below this layer, and the satellite signal receiving terminal collects and uses this transmitted data. According to such a configuration, in comparison with a case in the information center is re-accessed, the accessing time is shortened and the satellite circuit efficiency increases.

Figure 13:
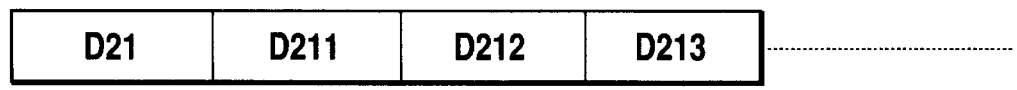
FIG. 13 is a diagram depicting a data transmission of this invention.

The operation of the fourth embodiment will now be explained in more detail with an example. As FIG. 13 shows, after transmitting the requested data D21 the information center 1 simultaneously transmits a multimedia packet of lower layer data continuing from D211, D212, D213. This data series is then collected at the satellite signal receiving terminal even if these lower layer data have not been requested. The satellite signal receiving terminal then registers in a reference area of the RAM 1112 the fact that these layer data sent from the information center are being collected, and whenever the satellite signal receiving terminal wishes to view these lower layer data it searches within its own collecting device in compliance with that reference area. Since no individual request is made for the data via a public telephone channel as above, accessing time is fast and the satellite circuit efficiency is increased. A B mode multimedia packet or a multimedia packet with a receiving terminal identifier at its header 5 for sending information only to a specified satellite signal receiving terminal (hereinafter referred to as a P mode multimedia packet) are also acceptable as the above-mentioned multimedia packet.

Embodiment 5

According to a fifth embodiment, together with the data of the accessed layer an information center accessed from a plurality of satellite signal receiving terminals also transmits data as far as a layer at a depth which corresponds to the number of requests, and the satellite signal receiving terminals collect and use the transmitted data. According to such a configuration, in comparison with a case in the information center is re-accessed, the accessing time is shortened and the satellite circuit efficiency increases.

Figure 14:
FIG. 14 is a diagram depicting a data transmission of this invention.
Figure 14:
Figure 14:

The operation of the fifth embodiment will now be explained in more detail with an example. As FIG. 13 of the fourth embodiment shows, after transmitting the requested data D21 the information center 1 simultaneously transmits a multimedia packet of lower layer data continuing from D211, D212, D213. Data up to a layer which corresponds to the number of requests for the D21 data at that point is sent, and a deeper layer of data is transmitted as the number of requests grows larger. An example of this is shown in FIG. 14. The data series is then collected at the satellite signal receiving terminal which has accessed the data D21. Since the satellite signal receiving terminal searches for these lower layer data in its own collecting device in the same way as in the fourth embodiment accessing time is rapid, and since no request for the data is made via a public telephone channel the satellite circuit efficiency is increased. Either a B mode or a P mode is acceptable as the above-mentioned multimedia packet.

Embodiment 6

According to a sixth embodiment, a layer identifier or a layer identifier and a number showing the number of requests for the data of that layer is added to the header 5 of a frame multimedia packet transmitted from an information center 1, only the layer identifier or the layer identifier and the number showing the number of requests for the data of that layer for the header 5 are displayed at the satellite signal receiving terminal, and are used as the requested product information or as the best-selling product information. Such a configuration allows advertising with a wealth of real time possibilities. Consequently this encourages the user's will to purchase and contributes to boosting opportunities for increasing demand.

Figure 15:
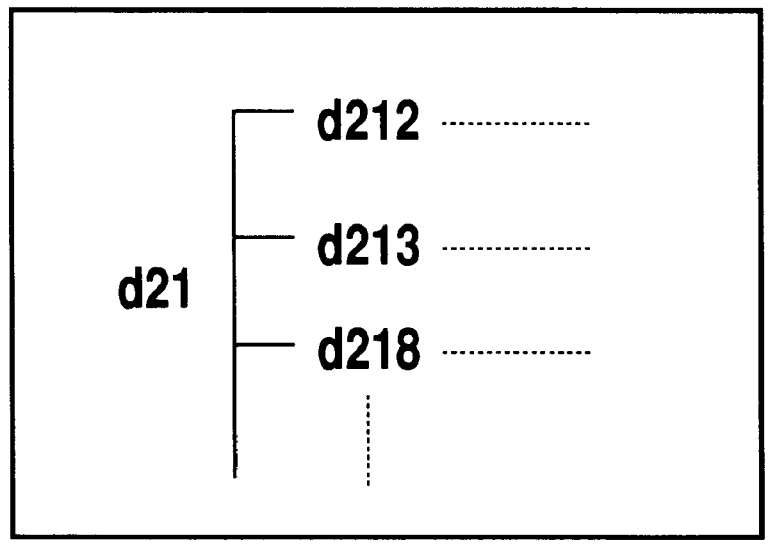
FIG. 15 is a display screen of a satellite signal receiving terminal of this invention.
Figure 16:
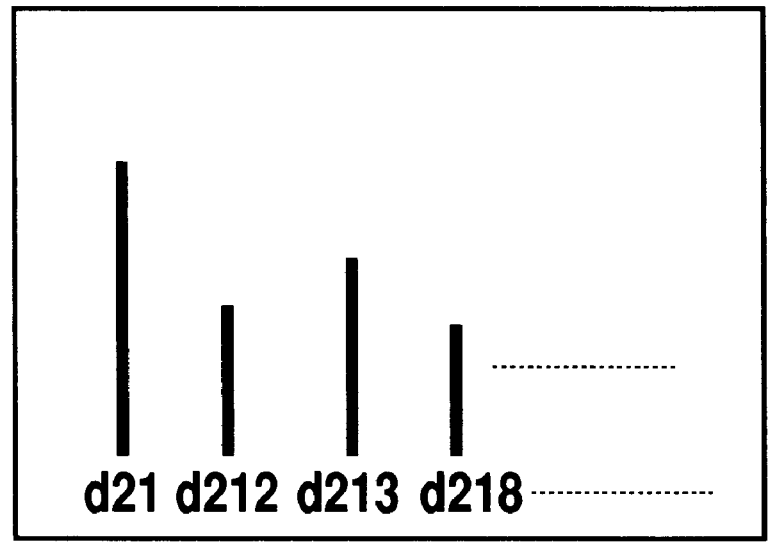
FIG. 16 is a display screen of a satellite signal receiving terminal of this invention.

In order to explain in more detail an example of the operation of the sixth embodiment we shall examine a case in which a B mode multimedia packet is used. In a case in which data is configured with the B mode multimedia packet shown in FIG. 7, irrespective of whether or not a request exists for that data only these layer identifiers are displayed at the satellite signal receiving terminal as a result of the operation at the satellite signal receiving terminal. FIG. 15 depicts an example of that display. In a real case at the satellite signal receiving terminal these would have names corresponding to the layer identifier and GUI graphics, for instance these might be names of the shops, names of types of goods, names of goods. In FIG. 15 a column of layered information corresponding to the information layer identifier presently being transmitted is displayed. In this case the information corresponding to the layer identifier being transmitted may displayed in its entirety, but in practice it is generally more likely that display would be limited to only the type of data in which the satellite signal receiving terminal is interested, for instance menswear. As another example, a case is possible in which only layer identifier and information above the number of repeating transmissions are displayed. FIG. 16 depicts an example of such a display. In this example, information below the d21 group is displayed with the number of repeating transmissions. In this way, the satellite signal receiving terminal can know beforehand whether or not the data it desired is being transmitted and at the same time can know immediately which products are selling best; thus this assists the information supplier in advertising the product and effectively encourages the user to make a purchase. In addition, the decisions as to which portion of this information to be used and how it is to be viewed may be decided by the information supplier. In that case, the GUI and the like in the application software to be downloaded to the satellite signal receiving terminal from the information center should be actuated at the start of the shopping service program.

Embodiment 7

Data irrelevant to the user are also present in this shopping information such as price differences varying according to distribution factors and regions, or regional features of stores. In a seventh embodiment of the present invention, by adding a data layer identifier and a region identifier showing the region to which the data is to be sent to a header 5 of a B mode multimedia packet transmitted from an information center 1, B mode multimedia packet levelled data can be provided with a region selecting function.

Figure 17:
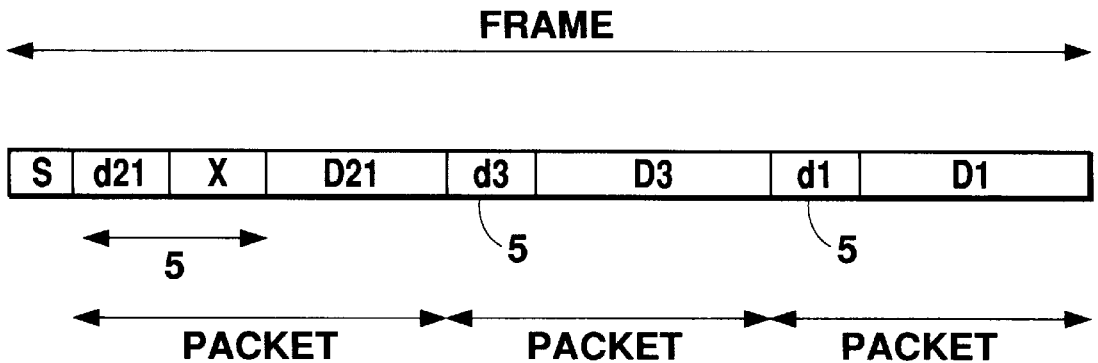
FIG. 17 is a diagram showing a frame configuration of this invention.

FIG. 17 is a diagram depicting a frame configuration according to the seventh embodiment, wherein a layer identifier d21 and a region identifier X have been added to the header 5 of the first multimedia packet, and only a satellite signal receiving terminal in the region specified by the region identifier X can read out this D21 data.

Figure 18:
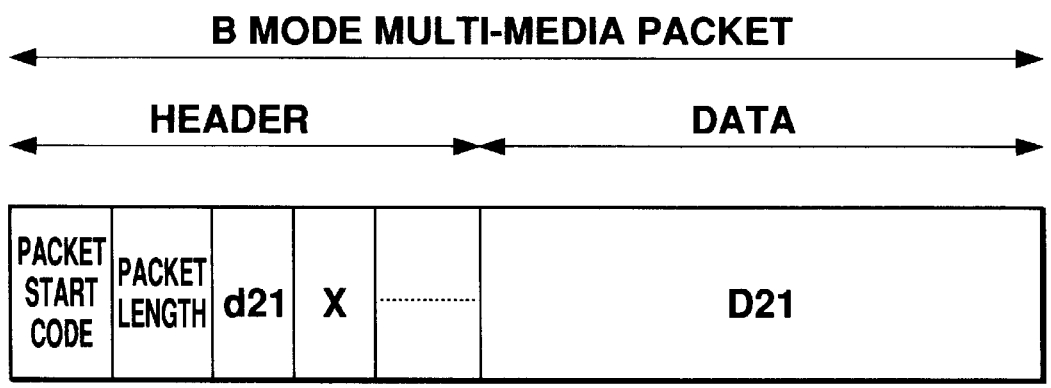
FIG. 18 is a configuration diagram of a multimedia packet of this invention.

In order to explain in more detail an example of the operation of the seventh embodiment we shall examine a case in which the B mode multimedia packet of FIG. 7 is used. FIG. 18 shows a case in which a region identifier X has been added to the header of a B mode multimedia packet. This type of B mode multimedia packet is configured at the server, divided into TS packets and transmitted. Operation up to the DEMUX 1104 of the satellite signal receiving terminal shown in FIG. 4 is identical to that explained in the first embodiment. At the DEMUX 1104 only the TS packet of this shopping service program for instance is selected and that packet is collected in the RAM 1112. Here the TS packet is synthesized by the CPU 1106 and reverted to a B mode multimedia packet including shopping information. The CPU 1106 then re-checks the information identifier or layer identifier of the B mode multimedia packet which has been received and if this matches the information identifier or layer identifier being requested by the satellite signal receiving terminal, the CPU goes on to check the next region identifier X. Since the satellite signal receiving terminal is required to be apportioned beforehand with its own region identifier, that apportioning may be set when the satellite signal receiving terminal is set, or in a case in which each of the satellite signal receiving terminals already has its own receiving terminal identifier, a region identifier based on the receiving terminal identifier may be transmitted through a satellite circuit and apportioned at the point when the shopping service beings from the information center 1, or this region identifier can be transmitted through a ground circuit (to be precise, a telephone communications circuit) and apportioned. Whichever method is used, since a satellite signal receiving terminal knows its own region identifier it can check whether this region identifier allocated beforehand matches the region identifier included in the played-back B mode multimedia packet and can display the data of the B mode multimedia packet if these two match or discard the data if they do not match. The data are subsequently decoded into text, graphics and still images at the multimedia DEC 1105 and displayed in the same manner as in the first embodiment. Consequently, layered data can be provided with a region selecting function. The information identifier or layer identifier is first checked here. The region identifier may first be checked instead.

In the above description of the embodiment a case was described in which the information center 1 executes transmission via a satellite circuit, but of course similar results can be obtained even if one portion of the information is transmitted from an information center to a satellite signal receiving terminal via a ground communications circuit. A case in which text information with a comparatively small information capacity is sent via the ground circuit and information with a large information capacity such as still image information is sent via the satellite circuit is an example of this.

Embodiment 8

According to an eight embodiment of the present invention, a B mode multimedia packet holding a data layer identifier in its header 5 has been combined with a multimedia packet holding a receiving terminal identifier in its header 5 (hereinafter referred to as a P mode multimedia packet) within a frame transmitted by an information center 1.

Figure 19:
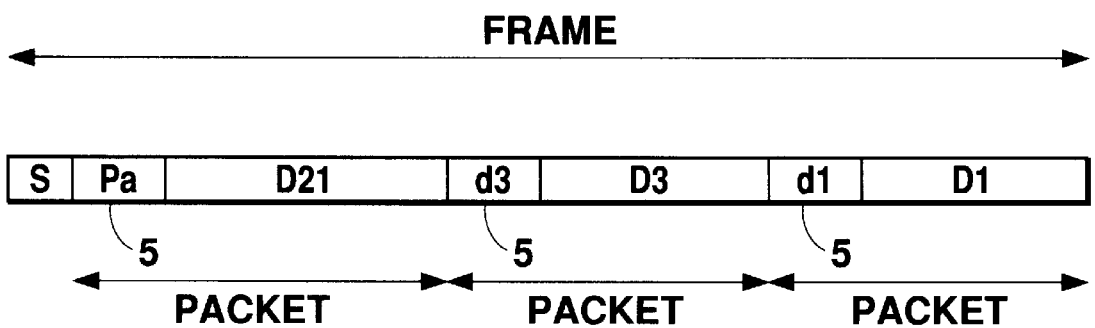
FIG. 19 is a diagram showing a frame configuration of this invention.

FIG. 19 shows the configuration of a frame according to the eight embodiment, in which Pa is a receiving terminal identifier inserted into the header 5, D21 is data which can be read out only by a satellite signal receiving terminal apportioned with this receiving identifier Pa; d3 and d1 are layer identifiers for data D3 and D1 which can be accessed by any satellite signal receiving terminals such as 3A~3N.

Shopping information occasionally features services designed for major customers and in such cases it is important to make clear to whom the information is destined; when the information of this receiving terminal identifier is especially confidential, a code may be allocated prior to transmission so that it can only be deciphered by a major customer.

In this eight embodiment, by combining within a single frame a P mode multimedia packet having a receiving terminal identifier and a B mode multimedia packet having a layer identifier or an identifier for identifying information even if not layered, it is possible to simulate a shopping mall shopping system. In other words, the B mode multimedia packet is equivalent to window-shopping in which one looks into a show window which anyone can access, while the P mode multimedia packet is equivalent to consulting a store assistant. In this case, the user in effect enters a store as the layer of the layer identifier deepens and by using actions corresponding to examining products directly or the like, the experience of walking through a shopping mall and buying goods can be realistically re-created.

Figure 20:
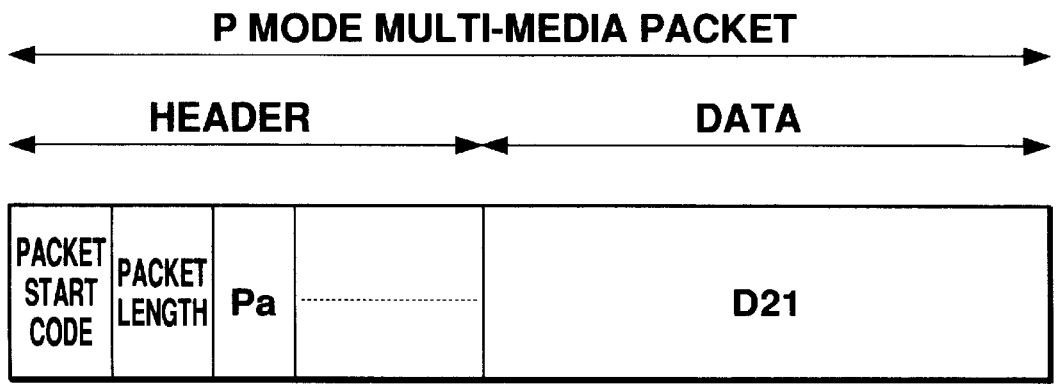
FIG. 20 is a configuration diagram of a multimedia packet of this invention.
Figure 21:
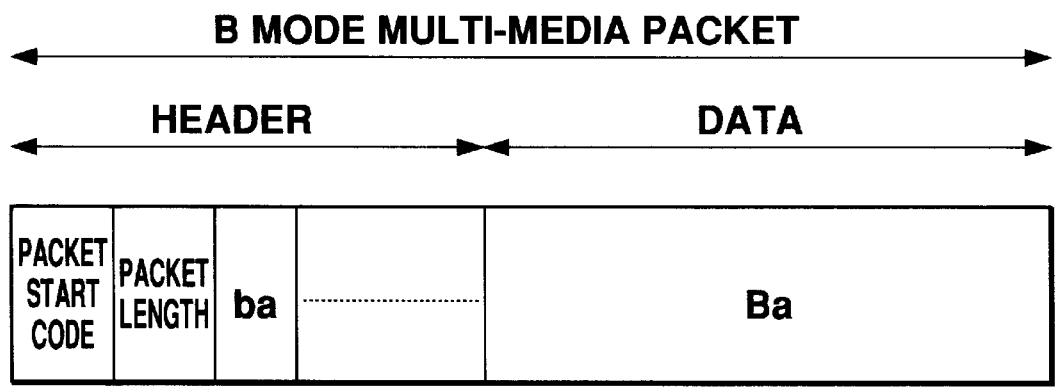
FIG. 21 is a configuration diagram of a multimedia packet of this invention.
Figure 22:
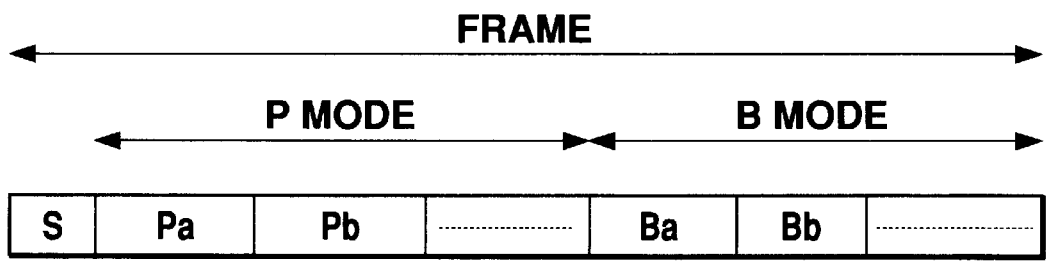
FIG. 22 is a diagram showing a frame configuration of this invention.

This embodiment will now be explained in greater detail. FIG. 20 shows a P mode multimedia packet which has a receiving terminal identifier Pa for a satellite signal receiving terminal 3A in its header region. Layered data D21 is here deemed to be data for transmission only to the satellite signal receiving terminal 3A. FIG. 21 shows a B mode multimedia packet which has a layer identifier corresponding to layered data Ba in its header region. The B mode multimedia packet in FIG. 21 can be received by anyone, and although there are cases in which transmission is limited to one time only, the B mode multimedia packet in FIG. 21 is transmitted repeatedly in order to simulate the action of walking through a shopping mall. The number of these repetitions can be determined based on the number of requests for that information as explained above or by another method. FIG. 22 depicts a case in which information destined for an individual which is basically to be transmitted only once (can be transmitted a plurality of times taking data damage into consideration) is combined within a single frame with information accessible by anyone which is to be transmitted repeatedly. In compliance with an application program and a remote control key operation downloaded to the satellite signal receiving terminal at the starting point of this shopping service, the satellite signal receiving terminal picks out and displays from a frame having the configuration shown in FIG. 22 the information sent in the P mode destined for the satellite signal receiving terminal itself and information sent in the B mode.

Figure 23:
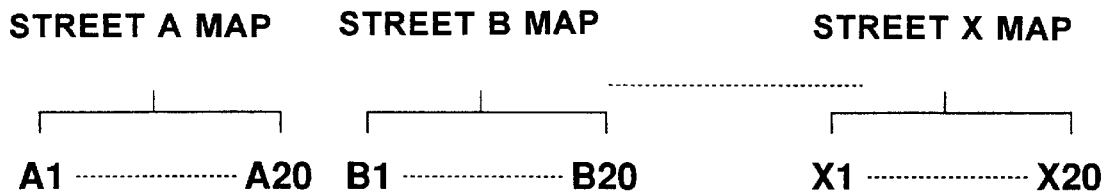
FIG. 23 is a diagram depicting a data layer of this invention.
Figure 24:
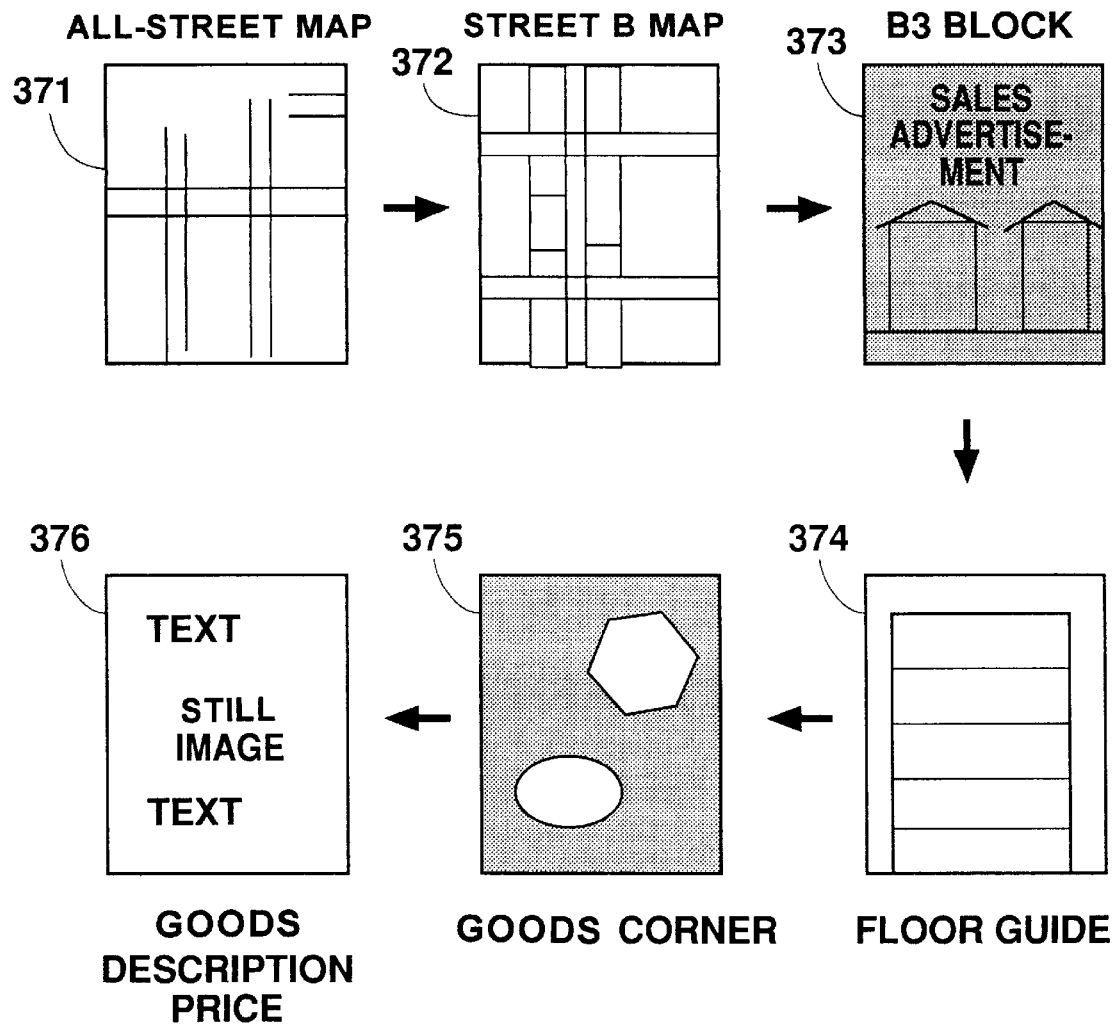
FIG. 24 is a display screen of a satellite signal receiving terminal of this invention.

Next a more specific explanation will be given of how the action of shopping in a virtual shopping mall can be simulated for the user using the B mode and the P mode. FIG. 23 shows one portion of layered information of a virtual shopping mall. The streets of the shopping mall extend from A to X and contain street-map information as shown at 372 in FIG. 24. Each street contains the information of a lower layer and is divided into blocks corresponding to a row of shops, for instance in street B, B1 to B20 are joined in sequence, the sending sequence likewise follows this sequence. When all streets A to X are now transmitted, information is cyclically transmitted in the sequence of A1, . . . , A20, B1, . . . , B20, . . . , X1, . . . , X20. The user's shopping action will be explained according to FIG. 24. In FIG. 24 371 is a map of all street routes from street A to street X. In this example, the data of layers up to 371 or 372 which is a map of each street are downloaded to the satellite signal receiving terminal beforehand. The user views this map of all the streets on the screen and selects for instance the street B map 372.

Figure 25:
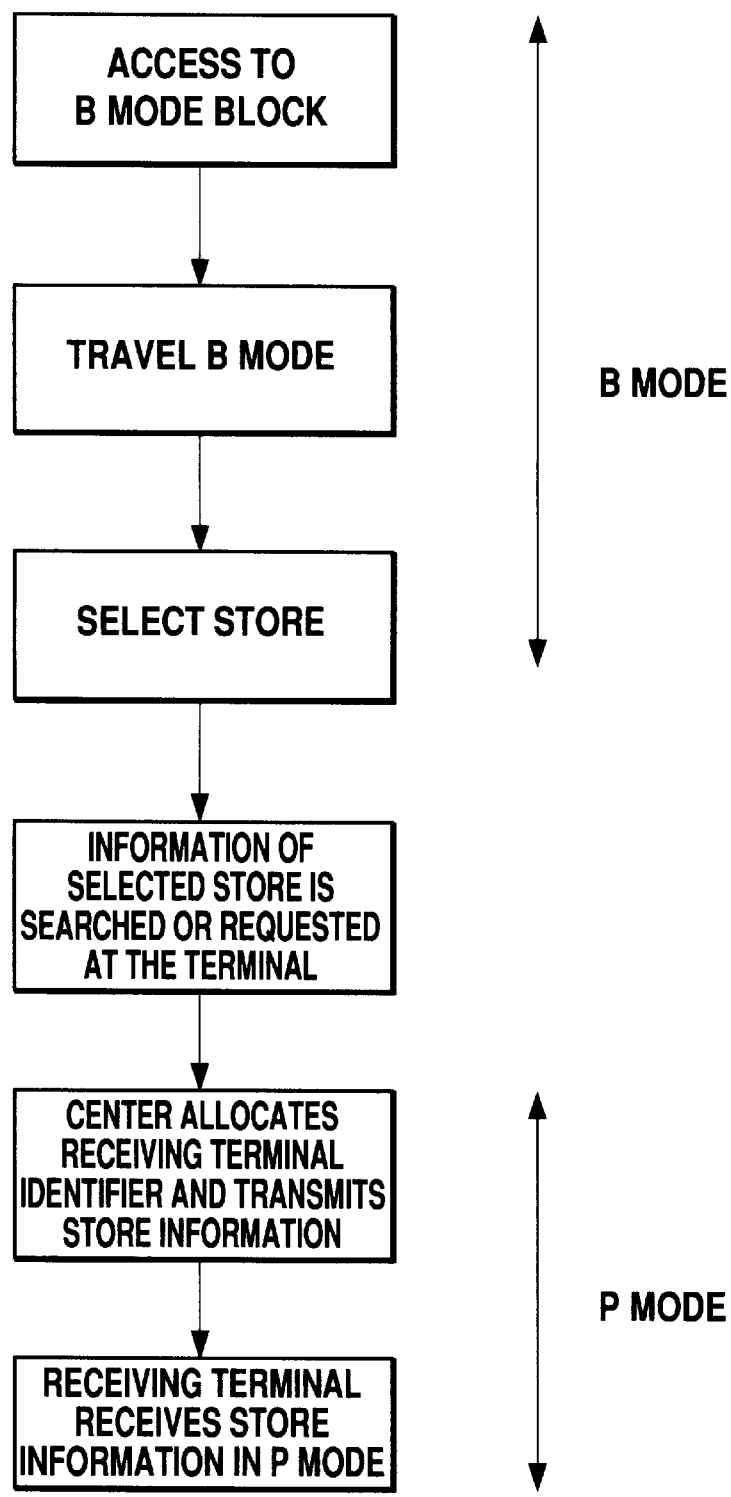
FIG. 25 is a diagram depicting an operation flow of a satellite signal receiving terminal of this invention.

Next the user selects one of the blocks while viewing the street B map 372. Now, as was explained above, the block information is being transmitted in the B mode and when the user clicks for instance the B3 block on the street B map 372 displayed on the screen, the B3 block 373 which is the data for the layer identifier b3 is excerpted from the block information of the cyclically repeating street B and is displayed. Since streets B1, B2, ~, B20 are being sequentially transmitted in a cycle, when the user scrolls on the screen 373, neighboring blocks are captured at the satellite signal receiving terminal in response to the scrolling direction, and the user thus window-shops through street B. Now let us imagine that after window-shopping the user selects one of the stores. As explained in the first and second embodiments, a check is first carried out to confirm whether this selected store is among the information transmitted from the satellite circuit; if it is not, a request is made to the center via a ground circuit. Screen 374 is a floor guide of a selected store. The information for this store floor guide can be sent in either B mode or P mode. Thereafter, unless there are particular specifications, information can be sent in either mode. The user selects the desired floor on the screen 374. Here too, if the information cannot be found on the satellite circuit a request is made to the center. A screen 375 shows a goods corner, where the user views photographs of goods transmitted repeatedly in cycles in B mode and wanders through the selected floor. When the user clicks some goods he likes on the screen 375, individual user price information and the like is transmitted in P mode as explained above. 376 is this screen. A flowchart is shown in FIG. 25. This flowchart depicts a case in which the terminal itself did not have the information for the selected store and in which that information is transmitted in P mode. The content of information for shops and goods and the like is controlled by a server in the information center 1, and—transmitted in B mode can be altered to render it more trendy, speedy and dynamic in response to the frequency of requests, providing a more attractive shopping service. In P mode, in addition to individual information, charged information can also be sent.

Figure 26:
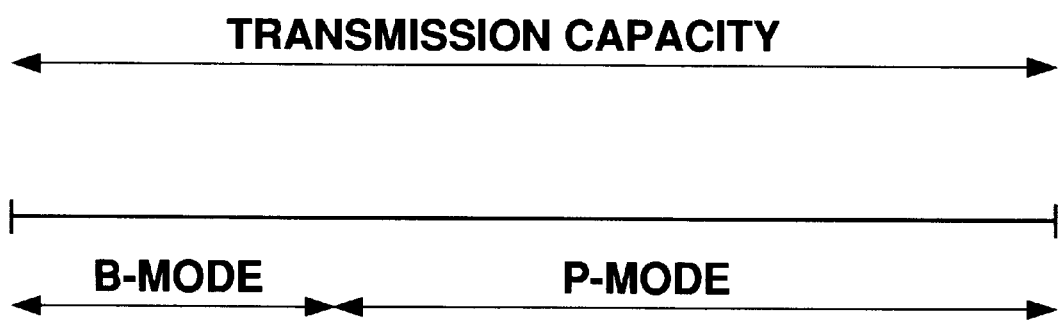
FIG. 26 is a diagram depicting a data transmission of this invention.

For a shopping service such as that described above, service is generally executed after fixedly apportioning one portion of the transmitting capacity of a satellite circuit. As FIG. 26 shows, as described above the transmitting capacity apportioned to this shopping service is used for the B mode and the P mode. Since circuit costs are generally calculated for a fixedly apportioned transmitting capacity, that capacity should be used to the full. In addition to simulating window shopping as described above, the B mode can be used for commercials and advertisements available to anyone. In response to the number of users who simultaneously access on the P mode, the information center adjusts the ratio of the P mode and B mode. When there are few users accessing on the P mode, the ratio apportioned to the B mode suitable for advertising is increased in order to increase purchases, and when many users who have simultaneously accessed with the P mode are having to wait for a long time to obtain information, the B mode transmissions are reduced. By thus dividing the apportioned transmitting capacity into B mode and P mode and adjusting the ratio between them, the circuit can be utilized efficiently in response to the user's usage of the service to encourage purchasing, or to increase the number of successful purchases by reducing user waiting time.

Figure 27:
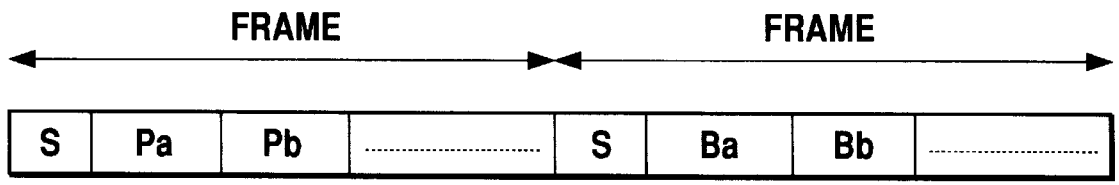
FIG. 27 is a diagram depicting a data transmission of this invention.
Figure 28:
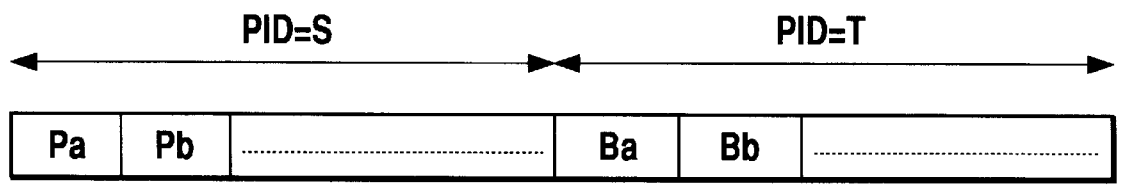
FIG. 28 is a diagram depicting a data transmission of this invention.

A case was shown here in which P mode and B mode multimedia packets were combined within a single frame, but similar results are obtained in a case in which frames are configured only by single modes, as FIG. 27 shows, or as FIG. 28 shows, in a case in which a separate program (that is, a separate PID) is apportioned to the group of B mode multimedia packets and the group of P mode multimedia packets. And of course, similar results are obtained in a case in which a B mode with a region identifier as described in the seventh embodiment is mixed with a normal B mode having no identifier and a P mode, or alternatively, a case where a B mode is mixed with a region identifier and a P mode.

Embodiment 9

Figure 29:
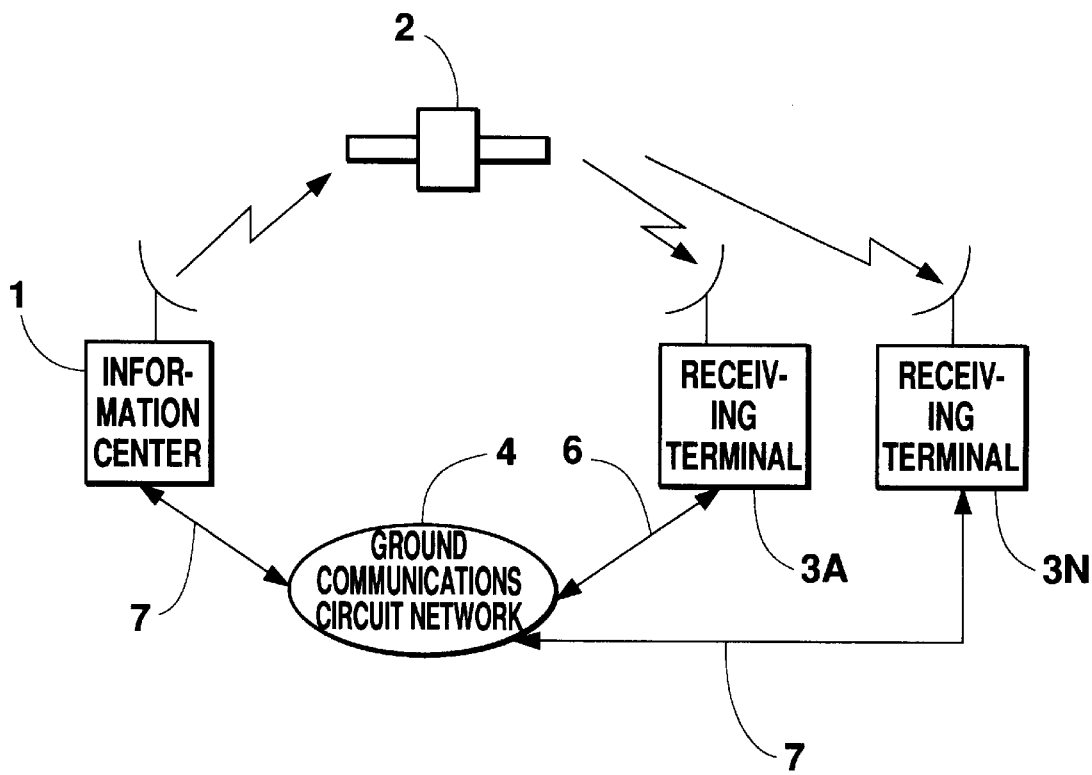
FIG. 29 is a system configuration diagram of this invention.

FIG. 29 is a block diagram of a ninth embodiment of the present invention, showing a case in which an information center 1 and satellite signal receiving terminals 3A~3N are connected by a two-way ground circuit 7 having a small transmitting capacity. The other features of the diagram are identical with FIG. 5. In the ninth embodiment, a satellite signal receiving terminal requests the apportioning of a receiving terminal identifier showing a satellite signal receiving terminal to an information center 1 via a ground circuit 7 when the satellite signal receiving terminal actually uses the system, and the information center 1 apportions this receiving terminal identifier via the ground circuit 7. According to this configuration, a finite number of identifiers can be used effectively and the number of subscribers can be increased to exceed the number of identifiers.

Figure 30:
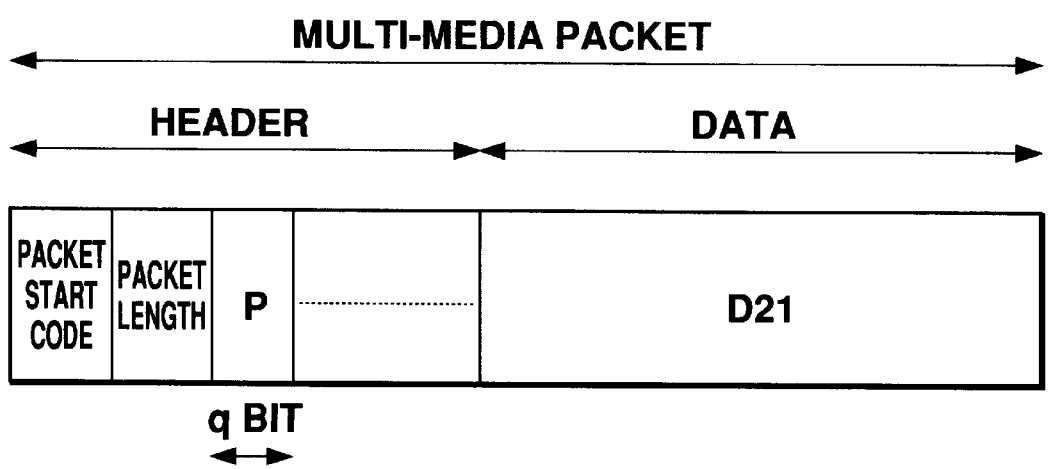
FIG. 30 is a configuration diagram of a multimedia packet of this invention.
Figure 31:
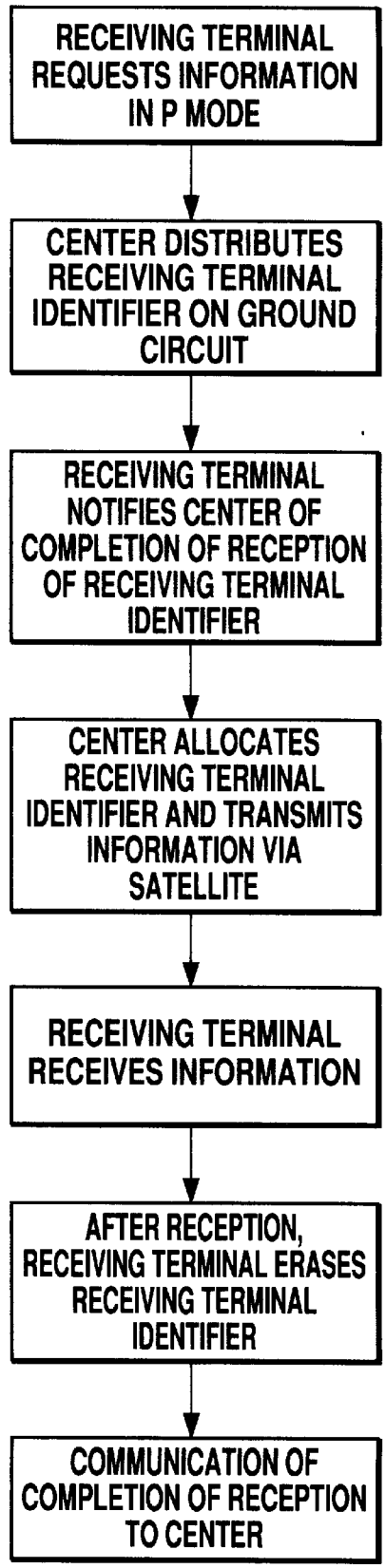
FIG. 31 is a diagram showing a system flow of this invention.

The present embodiment will now be explained in more detail. A receiving terminal identifier of a P mode multimedia packet can be apportioned to all the satellite signal receiving terminals from the start, but in that case an extremely large number of receiving terminal identifiers has to be prepared including those for satellite signal receiving terminals which are not using the P mode simultaneously. Moreover, when a receiving terminal identifier is fixedly apportioned to a satellite signal receiving terminal, if that identifier were somehow to fall into the hands of another person it would not be possible to protect information confidentiality. IC cards are generally distributed to satellite signal receiving terminals for purposes of descrambling or charging fee, and a private identifier is apportioned within that IC card using a large number of bits. Therefore it is possible to send private information using this identifier but the header of the P mode multimedia packet is lengthened and efficiency declines. A region P in a receiving terminal identifier shown in FIG. 30, based on traffic theory, clears beforehand a bit number q in order to ensure that the probability that the satellite signal receiving terminal accessing waiting time will exceed a certain value because the receiving terminal identifiers are all in use will be less than a permitted value. A satellite signal receiving terminal wanting to use the P mode requests a receiving terminal identifier at the same time as, or before it executes a request for information to the center. The information center 1 distributes a receiving terminal identifier not being used to the satellite signal receiving terminal via a ground circuit. Thereafter, once the satellite signal receiving terminal has notified the information center that the reception of the receiving terminal identifier has been completed, the information to which that receiving terminal identifier is allocated is transmitted via the satellite circuit. The satellite signal receiving terminal waits for the arrival of a P mode multimedia packet to which the distributed receiving terminal identifier has been allocated, recognizes the receiving terminal identifier at the CPU 1106 shown in FIG. 4 and receives the requested data. After receiving the data, the satellite signal receiving terminal itself erases the distributed receiving terminal identifier and also similarly notifies the information center 1 via the ground circuit when the reception of the data is completed. FIG. 31 shows a flowchart of the process at this time. According to the above method, the number of satellite signal receiving terminals—in other words the number of licensed receivers—can be increased to exceed the number of receiving terminal identifiers.

As described above, after receiving the data the satellite signal receiving terminal can itself erase the distributed receiving terminal identifier, but in order to ensure absolute secrecy, the information center 1 can also erase the distributed receiving terminal identifier held by the satellite signal receiving terminal using the ground circuit 7 after the satellite signal receiving terminal has notified the information center 1 of the completion of the data reception.

Embodiment 10

Figure 32:
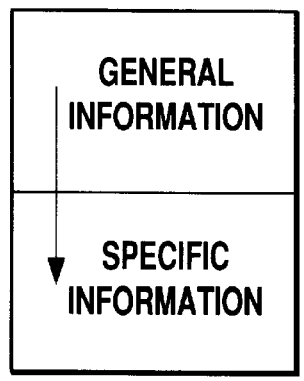
FIG. 32 is a data layer diagram of this invention.
Figure 33:
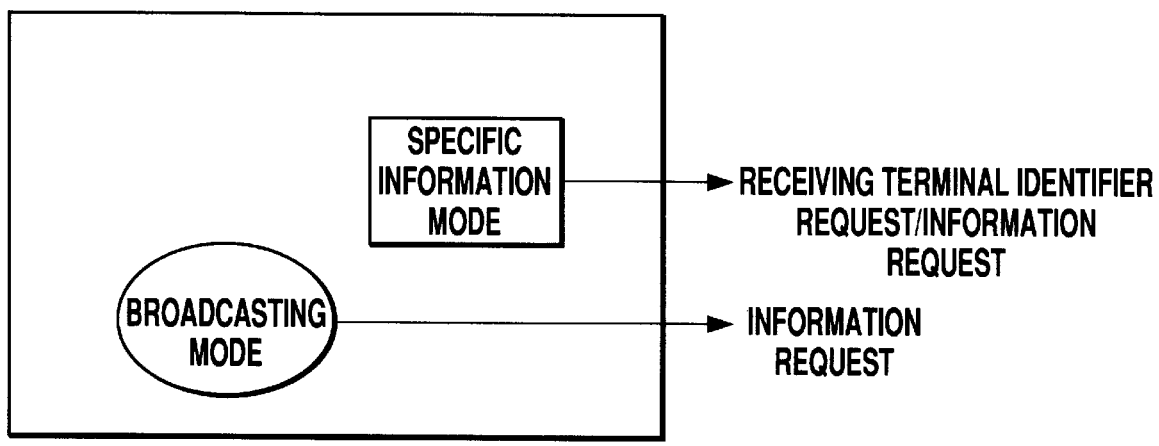
FIG. 33 is a diagram depicting a GUI of this invention.
Figure 34:
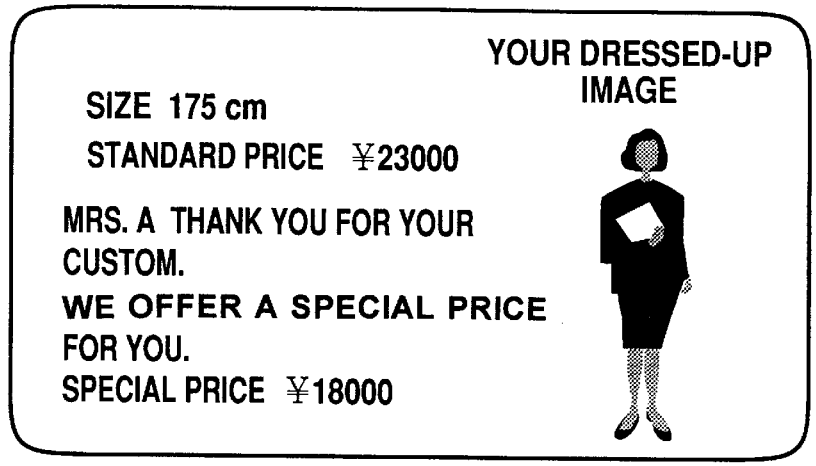
FIG. 34 is a diagram depicting a GUI of this invention.

As an example of layered information, FIG. 32 shows a case in which general information has been transmitted according to a layer identifier as a higher layer, and specific information has been transmitted according to a receiving terminal identifier as a lower layer. In the case of shopping for instance, information about goods would here come under general information and price information for separate customers for those goods would come under specific information. Using GUI downloaded at the commencement of the service, the user enters specific information from the general information by his operations on the screen. FIG. 33 shows the GUI displayed on the screen, and by clicking the icon leading to P mode information or the icon leading to B mode information, requests information from either mode can be requested to the center. As described in FIG. 31, since exchanges in the P mode with the center are automatically carried out in compliance with the applications software downloaded beforehand at the satellite signal receiving terminal, these cannot be recognized by the user. To this end, notification of entry into the P mode is displayed on the screen to the user. Thus the user can differentiate easily between the two modes and feel a special affinity to the P mode, which thereby encourages him to make a purchase. FIG. 34 shows an example of how the price can be presented to the user, in addition to inserting the user's name into messages and superimposing onto the dress a photograph of the user previously registered with the center, thereby increasing the user's affinity with the service.

In addition, a special surcharge is often imposed on the P mode. Consequently, by notifying the user that he is presently entering the P mode and positively making him aware that he is now subject to a special surcharge, this helps to reduce communications charges.

Embodiment 11

Figure 35:
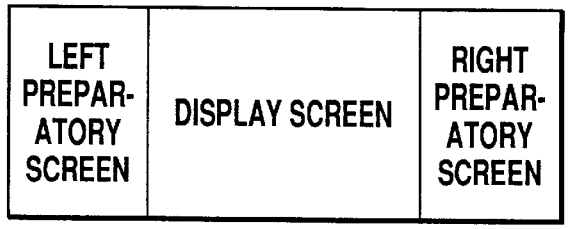
FIG. 35 is a diagram showing a collecting range of image information of a satellite signal receiving terminal of this invention.
Figure 36:
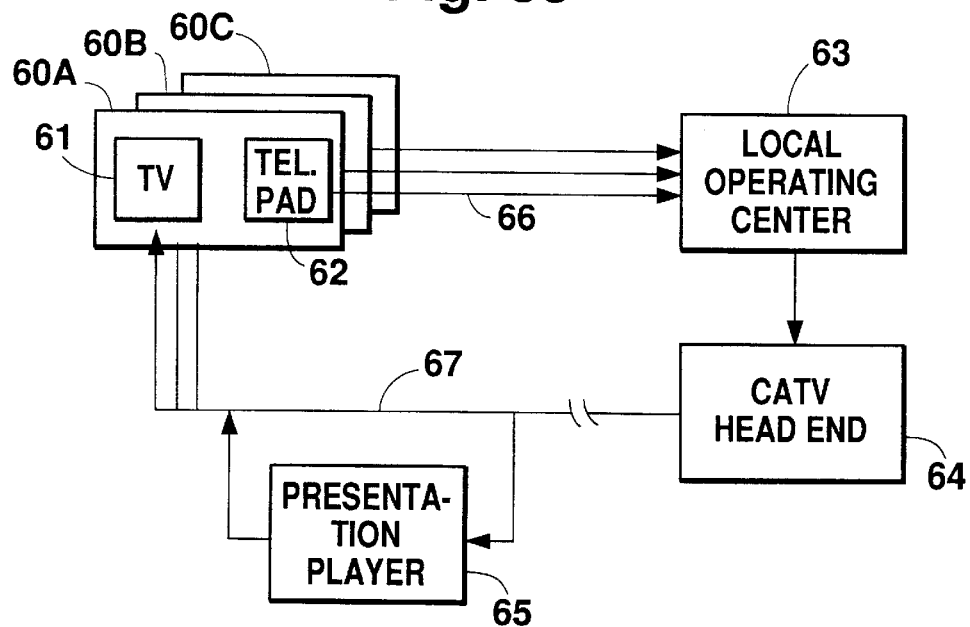
FIG. 36 is a configuration diagram of a prior shopping system.
Figure 37:
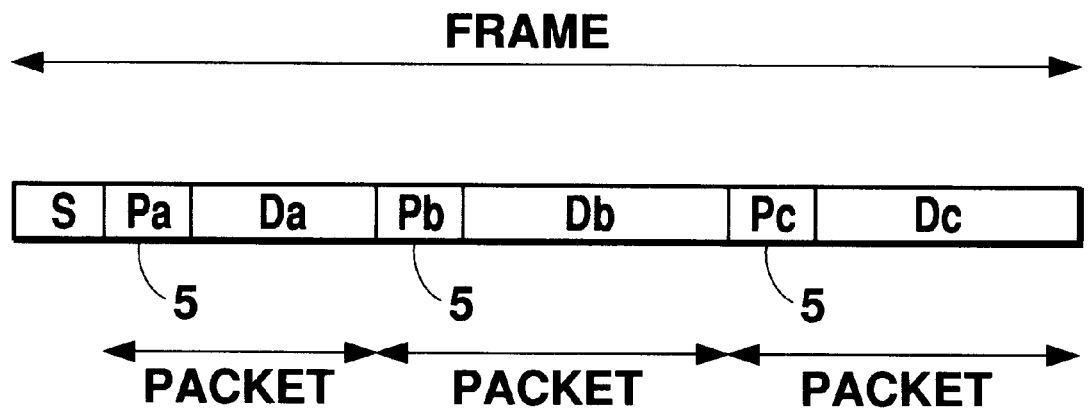
FIG. 37 is a configuration diagram of a prior frame.
Figure 38:
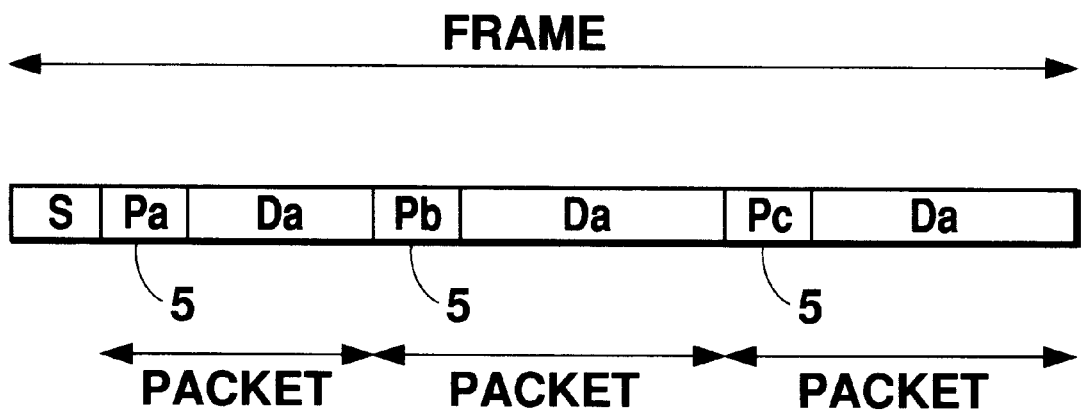
FIG. 38 is a configuration diagram of a prior frame.

As described in embodiment 2 and embodiment 8, best-selling products or popular shopping streets are repeatedly transmitted via a satellite communications or broadcasting system according to the present invention. Therefore the user looks around inside product groups consisting of best-selling products or shopping streets consisting of popular stores. On the screen, this action can be simulated by scrolling to the left and right within one portion of the screen consisting of a B multimedia packet. At this time there is no need to capture in the RAM of the satellite signal receiving terminal all the cyclically repeated information being transmitted, and by capturing in the satellite signal receiving terminal only the minimum amount of screen information necessary continuing to both sides capable of smoothly scrolled movement, the RAM capacity used by the satellite signal receiving terminal can be reduced. As FIG. 35 shows, the display screen is the one presently being displayed, and although the right preparatory screen and the left preparatory screen are not displayed they are the minimum amounts of screen information necessary continuing to both sides in accordance with scroll speed stored in the satellite signal receiving terminal. If the access time to an information center of a satellite is faster enough than this scroll speed, the right preparatory screen and the left preparatory screen may not be required.

While there has been described what are at present considered to be preferred embodiments of the invention, it will be understood that various modifications may be made to the present invention and it is intended that the appended claims cover all such modifications as fall within the true spirit and scope of the invention.

According to an invention an identifier was deemed to correspond to information content and therefore a satellite signal receiving terminal which wishes to receive the same information can do so directly from a satellite communications or broadcasting channel without making a request to an information center; thus in addition to increasing the efficiency of the satellite circuit accessing time can be shortened.

According to an invention, since the fact that identical information is to be re-transmitted is known from a transmission repeating number allocated to the information, the satellite signal receiving terminal can obtain the information directly from the satellite communications or broadcasting channel without making a request to the information center; thus in addition to increasing the efficiency of the satellite circuit accessing time can be shortened.

According to an invention since a satellite signal receiving terminal which has received information being transmitted on a satellite circuit from a mid-point can obtain the complete information by rearranging it into the correct order after collecting the received information, it is not necessary to make a request to an information center. Consequently, in addition to increasing the efficiency of the satellite circuit accessing time can be shortened.

According to an invention an information center transmits information up to a layer lower than the layer of the information requested by a satellite signal receiving terminal, thus the satellite signal receiving terminal does not need to make a request to the information center. Consequently, in addition to increasing the efficiency of the satellite circuit accessing time can be shortened.

According to an invention an information center transmits information up to a layer of a depth in accordance to the number of requests from a plurality of satellite signal receiving terminals, thus a satellite signal receiving terminal does not need to make an additional request to the information center. Consequently, in addition to increasing the efficiency of the satellite circuit accessing time can be shortened.

According to an invention a satellite signal receiving terminal learns from a received identifier or from the number of requests for that identifier the items of information or the popularity rating of information being requested by all the satellite signal receiving terminals, thus encouraging users to make purchases and contributing to advertising the products and the like contained in the information.

According to an invention since an information center executes transmission after adding a layer identifier and a region identifier in accordance with the content of the information, a satellite signal receiving terminal does not need to make a request to the information center, and in addition to increasing the efficiency of the satellite circuit accessing time can be shortened and regional features can be imparted to information in accordance with the region identifier, thus the content of the information can be altered for each region and ineffective information can be replaced with effective information depending on the region.

According to an invention an information center allocates and combines a layer identifier corresponding to the information contents and a receiving terminal identifier corresponding to the satellite signal receiving terminal prior to transmission, thus specialized information can be sent to the satellite signal receiving terminal and an increasingly real-life shopping process can be simulated.

According to an invention in response to a P mode accessing state the P mode and B mode ratio can be altered, thus a satellite circuit can be used economically.

According to an invention a shopping method can be easily and realistically created wherein individual information can be requested by wandering a shopping mall.

According to an invention an information center notifies a satellite signal receiving terminal of a relevant receiving terminal identifier via a ground circuit only in a case in which a request for reception has been made to the information center via a ground circuit from the relevant satellite signal receiving terminal, and adds the above-mentioned receiving terminal identifier to the information to be transmitted prior to transmission; thus a limited number of identifiers can be used effectively.

According to an invention in addition to the result obtained an information center adds a receiving terminal identifier specifying the relevant satellite signal receiving terminal to information only when a request for that information has been made by a satellite signal receiving terminal, apportions this receiving terminal identifier to the satellite signal receiving terminal via a ground circuit, and the satellite signal receiving terminal uses the above-mentioned apportioned receiving terminal identifier to select the information destined for the satellite signal receiving terminal itself; thus a limited number of identifiers can be used effectively.

According to an invention since the fact that a receiving terminal identifier has been added to information is displayed during the reception of that information, individual features of the information are clearly recognizable thus encouraging the will to purchase.

According to an invention since a satellite signal receiving terminal is collecting one portion of a screen adjacent to the present screen, the capacity of the satellite signal receiving terminal's RAM can be reduced.

What is claimed is:

1. A satellite communications or broadcasting system for transmitting information sent from an information center to a satellite signal receiving terminal via a satellite communications or broadcasting channel, wherein the information center includes
a content identifier allocating means for allocating a content identifier to the information to be transmitted based upon the content of that information, and for creating B mode information;
a receiving terminal identifier allocating means for allocating a receiving terminal identifier to information requested from the information center by the satellite signal receiving terminal showing a satellite signal receiving terminal to which that information is to be transmitted, and for creating P mode information; and
a transmitting means for combining B mode information and P mode information and transmitting them via a satellite communications or broadcasting channel; and the satellite signal receiving terminal includes
a B mode selective receiving means for receiving only information designated by the terminal itself based upon the content identifier included in the transmitted B mode information;
a P mode selective receiving means for receiving only information designated by the terminal itself based upon the content identifier included in the transmitted P mode information.

2. A satellite signal receiving terminal for receiving B mode information having a content identifier allocated based upon the content of the information and P mode information having an receiving terminal identifier allocated to show the satellite signal receiving terminal to which the information is to be transmitted from an information center via a satellite communications or broadcasting channel, wherein the satellite signal receiving terminal includes
a B mode selective receiving means for receiving only information designated by the terminal itself based upon the content identifier included in the transmitted B mode information;

a P mode selective receiving means for receiving only information designated by the terminal itself based upon the content identifier included in the transmitted P mode information; and the satellite signal receiving terminal dispenses a service by chronological combining of the B mode information and the P mode information.

3. A satellite communications or broadcasting system according to claim 1, wherein the information center includes a counting means for counting the number of requests of P mode information carried out by the satellite signal receiving terminal; and the transmitting means includes a determining means for determining a combining ratio for the B mode information and the P mode information based on the number of requests counted by the counting means;

transmitting means for combining the B mode information and the P mode information according to the combining ratio determined by the determining means and transmitting them via said satellite communications or broadcasting channel.

4. A satellite communications or broadcasting system according to claim 1, wherein the information center includes a cyclical transmitting means for repeatedly transmitting the B mode information in part or in whole.

5. A satellite communications or broadcasting system according to claim 1, wherein the information center includes a combined frame creating means for creating a combined frame in which the B mode information and the P mode information have been combined; and the transmitting means transmits the combined frame.

6. A satellite communications or broadcasting system according to claim 1, wherein the information center includes a B mode frame creating means for creating a B mode frame including only the B mode information; and a P mode frame creating means for creating a P mode frame including only the P mode information ; and the transmitting means combines and transmits the B mode frame and the P mode frame.

7. A satellite communications or broadcasting system according to claim 1, wherein the information center includes a B mode program creating means for supplying only the B mode information to a designated program and creating a program including only B mode information; and a P mode program creating means for supplying only the P mode information to another designated program and creating a program including only P mode information; and the transmitting means combines and transmits the B mode program and the P mode program.

8. A satellite communications or broadcasting system for transmitting information sent from an information center to a satellite signal receiving terminal via a satellite communications or broadcasting channel, wherein the satellite signal receiving terminal includes a requesting means for requesting the information center via a ground circuit to the effect that the satellite signal receiving terminal wants to receive the information;

a judging means for judging whether or not P mode information transmitted from the information center is information transmitted to the terminal itself based on the receiving terminal identifier included in the P mode information; and the information center includes a delivering means for delivering a designated receiving terminal identifier to the satellite signal receiving terminal via a ground circuit in response to a request in a case where there has been a request from the satellite signal receiving terminal, a receiving terminal identifier allocating means for allocating the delivered receiving terminal identifier to a designated information and for creating P mode information; and a transmitting means for transmitting the P mode information via said satellite communications or broadcasting channel.

9. A satellite communications or broadcasting system for transmitting information sent from an information center to a satellite signal receiving terminal via a satellite communications or broadcasting channel, wherein the information center includes a content identifier allocating means for allocating a content identifier to the information to be transmitted based upon the content of that information, and for creating B mode information;

a content region identifier allocating means for allocating an identifier to information to be transmitted based on a region identifier showing the region to which the information is to be transmitted and on a content identifier of that information, and for creating A mode information;

a receiving terminal identifier allocating means for allocating a receiving terminal identifier to information requested to the information center by the satellite signal receiving terminal showing a satellite signal receiving terminal to which that information is to be transmitted, and for creating P mode information;

a transmitting means for combining and transmitting the B mode information and the A mode information and the P mode information via said satellite communications or broadcasting channel; and the satellite signal receiving terminal includes a B mode selective receiving means for receiving only information which is desired by the terminal itself based on the content identifier included in the transmitted B mode information, an A mode selective receiving means for receiving only the information which includes the region identifier showing the region in which the terminal itself is positioned based on the region identifier included in the transmitted A mode information; and a P mode selective receiving means for receiving only the information which has been transmitted to the terminal itself based on the receiving terminal identifier included in the transmitted P mode information.

10. A satellite signal receiving terminal according to claim 2, characterized in that it includes a display means for executing a display to the effect that the P mode information is being received when the P mode selective receiving means is receiving the P mode information.

* * * * *